US 8,977,636 B2

(12) United States Patent
Bodin et al.

(10) Patent No.: US 8,977,636 B2
(45) Date of Patent: Mar. 10, 2015

(54) SYNTHESIZING AGGREGATE DATA OF DISPARATE DATA TYPES INTO DATA OF A UNIFORM DATA TYPE

(75) Inventors: William K. Bodin, Austin, TX (US); David Jaramillo, Lake Worth, TX (US); Jerry W. Redman, Cedar Park, TX (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 463 days.

(21) Appl. No.: 11/207,911

(22) Filed: Aug. 19, 2005

(65) Prior Publication Data

US 2007/0043758 A1    Feb. 22, 2007

(51) Int. Cl.
G06F 17/30 (2006.01)

(52) U.S. Cl.
CPC ...... *G06F 17/3089* (2013.01); *G06F 17/30914* (2013.01)
USPC ........................................ 707/756

(58) Field of Classification Search
None
See application file for complete search history.

(56) References Cited

U.S. PATENT DOCUMENTS

| 4,785,408 A | 11/1988 | Britton et al. |
| 5,341,469 A * | 8/1994 | Rossberg et al. ............. 715/205 |
| 5,377,354 A | 12/1994 | Scannell et al. |
| 5,564,043 A | 10/1996 | Siefert |
| 5,566,291 A | 10/1996 | Boulton et al. |
| 5,613,032 A | 3/1997 | Cruz et al. |
| 5,715,370 A | 2/1998 | Luther et al. |
| 5,732,216 A | 3/1998 | Logan et al. |
| 5,774,131 A | 6/1998 | Kim |
| 5,819,220 A | 10/1998 | Sarukkai et al. |
| 5,884,266 A | 3/1999 | Dvorak |
| 5,890,117 A | 3/1999 | Silverman |
| 5,892,825 A | 4/1999 | Mages et al. |
| 5,901,287 A | 5/1999 | Bull et al. |
| 5,903,727 A | 5/1999 | Nielsen |
| 5,911,776 A | 6/1999 | Guck |
| 5,978,463 A | 11/1999 | Jurkevics et al. |

(Continued)

FOREIGN PATENT DOCUMENTS

| CN | 1123075 | 5/1996 |
| CN | 1123075 A | 5/1996 |

(Continued)

OTHER PUBLICATIONS

D. Bainbridge, S. J. Cunningham, and J. S. Downie, "Visual collaging of music in a digital library", in Proc. Int. Conf. Music Information Retrieval, Barcelona, Spain, 2004, pp. 397-402.*

(Continued)

*Primary Examiner* — Jay Morrison
(74) *Attorney, Agent, or Firm* — Brevetto Law Group

(57) ABSTRACT

Methods, systems, and products are disclosed for synthesizing the aggregated data of disparate data types into data of a uniform data type which includes receiving aggregated data of disparate data types and translating each of the aggregated data of disparate data types into text content and markup associated with the text content. Synthesizing the aggregated data of disparate data types into data of a uniform data type may also include dynamically creating grammar sets for the text content and associating the grammar sets with the text content. Associating the grammar sets with the text content includes inserting markup in the translated data.

15 Claims, 12 Drawing Sheets

(56) References Cited

U.S. PATENT DOCUMENTS

| | | | |
|---|---|---|---|
| 6,006,187 A | 12/1999 | Tanenblatt | |
| 6,012,098 A * | 1/2000 | Bayeh et al. | 709/246 |
| 6,029,135 A | 2/2000 | Krasle | |
| 6,032,260 A | 2/2000 | Sasmazel et al. | |
| 6,044,347 A | 3/2000 | Abella et al. | |
| 6,055,525 A | 4/2000 | Nusbickel | |
| 6,064,961 A | 5/2000 | Hanson | |
| 6,088,026 A | 7/2000 | Williams | |
| 6,092,121 A | 7/2000 | Bennett et al. | |
| 6,115,482 A | 9/2000 | Sears et al. | |
| 6,115,686 A | 9/2000 | Chung et al. | |
| 6,141,693 A | 10/2000 | Perlman et al. | |
| 6,178,511 B1 | 1/2001 | Cohen et al. | |
| 6,199,076 B1 | 3/2001 | Logan et al. | |
| 6,233,318 B1 | 5/2001 | Picard et al. | |
| 6,240,391 B1 | 5/2001 | Ball et al. | |
| 6,266,649 B1 | 7/2001 | Linden et al. | |
| 6,272,461 B1 | 8/2001 | Meredith et al. | |
| 6,282,511 B1 | 8/2001 | Mayer | |
| 6,282,512 B1 | 8/2001 | Hemphill | |
| 6,311,194 B1 | 10/2001 | Sheth et al. | |
| 6,317,714 B1 | 11/2001 | Del Castillo et al. | |
| 6,324,511 B1 | 11/2001 | Kiraly et al. | |
| 6,397,185 B1 | 5/2002 | Komissarchik et al. | |
| 6,463,440 B1 | 10/2002 | Hind et al. | |
| 6,468,084 B1 | 10/2002 | MacMillan | |
| 6,480,860 B1 * | 11/2002 | Monday | 707/102 |
| 6,510,413 B1 | 1/2003 | Walker | |
| 6,519,617 B1 | 2/2003 | Wanderski et al. | |
| 6,532,477 B1 | 3/2003 | Tang et al. | |
| 6,563,770 B1 | 5/2003 | Kokhab | |
| 6,568,939 B1 | 5/2003 | Edgar | |
| 6,574,599 B1 | 6/2003 | Lim et al. | |
| 6,593,943 B1 | 7/2003 | MacPhail | |
| 6,594,637 B1 | 7/2003 | Furukawa et al. | |
| 6,604,076 B1 | 8/2003 | Holley et al. | |
| 6,611,876 B1 * | 8/2003 | Barrett et al. | 709/246 |
| 6,644,973 B2 | 11/2003 | Oster | |
| 6,684,370 B1 | 1/2004 | Sikorsky et al. | |
| 6,687,678 B1 | 2/2004 | Yorimatsu et al. | |
| 6,728,680 B1 | 4/2004 | Aaron et al. | |
| 6,731,993 B1 | 5/2004 | Carter et al. | |
| 6,771,743 B1 | 8/2004 | Butler et al. | |
| 6,792,407 B2 | 9/2004 | Kibre et al. | |
| 6,802,041 B1 | 10/2004 | Rehm | |
| 6,810,146 B2 | 10/2004 | Loui et al. | |
| 6,820,135 B1 * | 11/2004 | Dingman et al. | 709/246 |
| 6,832,196 B2 | 12/2004 | Reich | |
| 6,839,669 B1 | 1/2005 | Gould et al. | |
| 6,859,527 B1 | 2/2005 | Banks et al. | |
| 6,901,403 B1 * | 5/2005 | Bata et al. | 707/101 |
| 6,912,691 B1 | 6/2005 | Dodrill et al. | |
| 6,931,587 B1 | 8/2005 | Krause | |
| 6,944,214 B1 | 9/2005 | Gilbert | |
| 6,944,591 B1 | 9/2005 | Raghunandan | |
| 6,965,569 B1 | 11/2005 | Carolan et al. | |
| 6,976,082 B1 | 12/2005 | Ostermann et al. | |
| 6,990,451 B2 | 1/2006 | Case et al. | |
| 6,992,451 B2 | 1/2006 | Kamio et al. | |
| 6,993,476 B1 | 1/2006 | Dutta et al. | |
| 7,017,120 B2 | 3/2006 | Shnier | |
| 7,031,477 B1 | 4/2006 | Mella et al. | |
| 7,039,643 B2 | 5/2006 | Sena et al. | |
| 7,046,772 B1 | 5/2006 | Moore et al. | |
| 7,054,818 B2 | 5/2006 | Sharma et al. | |
| 7,062,437 B2 | 6/2006 | Kovales et al. | |
| 7,065,222 B2 | 6/2006 | Wilcock | |
| 7,069,092 B2 | 6/2006 | Wiser et al. | |
| 7,096,183 B2 | 8/2006 | Junqua | |
| 7,107,281 B2 | 9/2006 | De La Huerga | |
| 7,113,909 B2 | 9/2006 | Nukaga et al. | |
| 7,120,702 B2 | 10/2006 | Huang et al. | |
| 7,130,850 B2 | 10/2006 | Russell-Falla et al. | |
| 7,139,713 B2 | 11/2006 | Falcon et al. | |
| 7,149,694 B1 | 12/2006 | Harb et al. | |
| 7,149,810 B1 | 12/2006 | Miller et al. | |
| 7,162,502 B2 * | 1/2007 | Suarez et al. | 707/203 |
| 7,171,411 B1 | 1/2007 | Lewis et al. | |
| 7,178,100 B2 * | 2/2007 | Call | 715/513 |
| 7,191,133 B1 | 3/2007 | Pettay | |
| 7,313,528 B1 | 12/2007 | Miller | |
| 7,346,649 B1 | 3/2008 | Wong | |
| 7,349,949 B1 | 3/2008 | Connor et al. | |
| 7,356,470 B2 | 4/2008 | Roth et al. | |
| 7,366,712 B2 | 4/2008 | He et al. | |
| 7,369,988 B1 * | 5/2008 | Thenthiruperai et al. | 704/10 |
| 7,386,575 B2 | 6/2008 | Bashant et al. | |
| 7,392,102 B2 | 6/2008 | Sullivan et al. | |
| 7,430,510 B1 | 9/2008 | De Fabbrizio et al. | |
| 7,433,819 B2 | 10/2008 | Adams et al. | |
| 7,437,408 B2 | 10/2008 | Schwartz et al. | |
| 7,454,346 B1 | 11/2008 | Dodrill et al. | |
| 7,505,978 B2 | 3/2009 | Bodin et al. | |
| 7,542,903 B2 | 6/2009 | Azara et al. | |
| 7,552,055 B2 | 6/2009 | Lecoeuche | |
| 7,561,932 B1 | 7/2009 | Holmes et al. | |
| 7,568,213 B2 | 7/2009 | Carhart et al. | |
| 7,657,006 B2 | 2/2010 | Woodring | |
| 7,664,641 B1 | 2/2010 | Pettay et al. | |
| 7,685,525 B2 | 3/2010 | Kumar et al. | |
| 7,729,478 B1 | 6/2010 | Coughlan et al. | |
| 7,873,520 B2 | 1/2011 | Paik | |
| 7,890,517 B2 | 2/2011 | Angelo et al. | |
| 7,949,681 B2 | 5/2011 | Bodin et al. | |
| 7,996,754 B2 | 8/2011 | Bodin et al. | |
| 2001/0014146 A1 | 8/2001 | Beyda et al. | |
| 2001/0027396 A1 | 10/2001 | Sato | |
| 2001/0040900 A1 | 11/2001 | Salmi et al. | |
| 2001/0047349 A1 | 11/2001 | Easty et al. | |
| 2001/0049725 A1 | 12/2001 | Kosuge | |
| 2001/0054074 A1 | 12/2001 | Hayashi | |
| 2002/0013708 A1 | 1/2002 | Walker et al. | |
| 2002/0015480 A1 | 2/2002 | Daswani et al. | |
| 2002/0032564 A1 | 3/2002 | Ehsani et al. | |
| 2002/0032776 A1 | 3/2002 | Hasegawa et al. | |
| 2002/0039426 A1 | 4/2002 | Takemoto et al. | |
| 2002/0054090 A1 | 5/2002 | Silva et al. | |
| 2002/0057678 A1 | 5/2002 | Jiang et al. | |
| 2002/0062216 A1 | 5/2002 | Guenther et al. | |
| 2002/0062393 A1 | 5/2002 | Borger et al. | |
| 2002/0083013 A1 | 6/2002 | Rollins et al. | |
| 2002/0095292 A1 | 7/2002 | Mittal et al. | |
| 2002/0120451 A1 | 8/2002 | Kato et al. | |
| 2002/0120693 A1 | 8/2002 | Rudd et al. | |
| 2002/0128837 A1 | 9/2002 | Morin | |
| 2002/0130891 A1 | 9/2002 | Singer | |
| 2002/0143414 A1 | 10/2002 | Wilcock | |
| 2002/0151998 A1 | 10/2002 | Kemppi et al. | |
| 2002/0152210 A1 | 10/2002 | Johnson et al. | |
| 2002/0169770 A1 | 11/2002 | Kim et al. | |
| 2002/0173964 A1 | 11/2002 | Reich | |
| 2002/0178007 A1 | 11/2002 | Slotznick et al. | |
| 2002/0193894 A1 | 12/2002 | Terada et al. | |
| 2002/0194286 A1 | 12/2002 | Matsuura et al. | |
| 2002/0194480 A1 | 12/2002 | Nagao | |
| 2002/0198714 A1 | 12/2002 | Zhou | |
| 2002/0198720 A1 | 12/2002 | Takagi et al. | |
| 2003/0013073 A1 | 1/2003 | Duncan et al. | |
| 2003/0018727 A1 | 1/2003 | Yamamoto | |
| 2003/0028380 A1 | 2/2003 | Freeland et al. | |
| 2003/0033331 A1 | 2/2003 | Sena et al. | |
| 2003/0055835 A1 * | 3/2003 | Roth | 707/102 |
| 2003/0055868 A1 | 3/2003 | Fletcher et al. | |
| 2003/0078780 A1 | 4/2003 | Kochanski et al. | |
| 2003/0103606 A1 | 6/2003 | Rhie et al. | |
| 2003/0108184 A1 | 6/2003 | Brown et al. | |
| 2003/0110185 A1 | 6/2003 | Rhoads | |
| 2003/0110272 A1 | 6/2003 | du Castel et al. | |
| 2003/0110297 A1 | 6/2003 | Tabatabai et al. | |
| 2003/0115056 A1 | 6/2003 | Gusler et al. | |
| 2003/0115064 A1 | 6/2003 | Gusler et al. | |
| 2003/0115289 A1 | 6/2003 | Chinn et al. | |
| 2003/0126293 A1 | 7/2003 | Bushey | |
| 2003/0132953 A1 | 7/2003 | Johnson et al. | |

(56) References Cited

U.S. PATENT DOCUMENTS

| | | |
|---|---|---|
| 2003/0145062 A1* | 7/2003 | Sharma et al. .................. 709/217 |
| 2003/0151618 A1 | 8/2003 | Johnson et al. |
| 2003/0156130 A1 | 8/2003 | James et al. |
| 2003/0158737 A1 | 8/2003 | Csicsatka |
| 2003/0160770 A1 | 8/2003 | Zimmerman |
| 2003/0163211 A1 | 8/2003 | Van Der Meulen |
| 2003/0167234 A1 | 9/2003 | Bodmer et al. |
| 2003/0172066 A1 | 9/2003 | Cooper et al. |
| 2003/0182000 A1 | 9/2003 | Muesch et al. |
| 2003/0182124 A1 | 9/2003 | Khan |
| 2003/0187668 A1 | 10/2003 | Ullmann et al. |
| 2003/0187726 A1 | 10/2003 | Bull et al. |
| 2003/0188255 A1 | 10/2003 | Shimizu et al. |
| 2003/0212654 A1 | 11/2003 | Harper et al. |
| 2003/0225599 A1 | 12/2003 | Mueller et al. |
| 2003/0229847 A1 | 12/2003 | Kim |
| 2004/0003394 A1 | 1/2004 | Ramaswamy |
| 2004/0034653 A1 | 2/2004 | Maynor et al. |
| 2004/0041835 A1 | 3/2004 | Lu |
| 2004/0044665 A1 | 3/2004 | Nwabueze |
| 2004/0049477 A1* | 3/2004 | Powers et al. ...................... 707/1 |
| 2004/0067472 A1 | 4/2004 | Polanyi et al. |
| 2004/0068552 A1 | 4/2004 | Kotz et al. |
| 2004/0088063 A1 | 5/2004 | Hoshi et al. |
| 2004/0088349 A1 | 5/2004 | Beck et al. |
| 2004/0093350 A1* | 5/2004 | Alexander et al. ......... 707/104.1 |
| 2004/0107125 A1 | 6/2004 | Guheen et al. |
| 2004/0120479 A1 | 6/2004 | Creamer et al. |
| 2004/0128276 A1 | 7/2004 | Scanlon et al. |
| 2004/0143430 A1 | 7/2004 | Said et al. |
| 2004/0153178 A1 | 8/2004 | Koch et al. |
| 2004/0172254 A1* | 9/2004 | Sharma et al. .............. 704/270.1 |
| 2004/0199375 A1 | 10/2004 | Ehsani et al. |
| 2004/0201609 A1 | 10/2004 | Obrador |
| 2004/0210626 A1 | 10/2004 | Bodin et al. |
| 2004/0225499 A1 | 11/2004 | Wang et al. |
| 2004/0243611 A1* | 12/2004 | Alexander et al. ............. 707/100 |
| 2004/0254851 A1 | 12/2004 | Himeno et al. |
| 2004/0267387 A1 | 12/2004 | Samadani |
| 2004/0267774 A1 | 12/2004 | Lin et al. |
| 2005/0004992 A1 | 1/2005 | Horstmann et al. |
| 2005/0015254 A1 | 1/2005 | Beaman |
| 2005/0015718 A1 | 1/2005 | Sambhus et al. |
| 2005/0021826 A1 | 1/2005 | Kumar |
| 2005/0043940 A1 | 2/2005 | Elder |
| 2005/0045373 A1 | 3/2005 | Born |
| 2005/0065625 A1 | 3/2005 | Sass |
| 2005/0071780 A1 | 3/2005 | Muller et al. |
| 2005/0076365 A1 | 4/2005 | Popov et al. |
| 2005/0088981 A1 | 4/2005 | Woodruff et al. |
| 2005/0108521 A1 | 5/2005 | Silhavy et al. |
| 2005/0114139 A1 | 5/2005 | Dincer |
| 2005/0119894 A1 | 6/2005 | Cutler et al. |
| 2005/0120083 A1 | 6/2005 | Aizawa et al. |
| 2005/0137875 A1 | 6/2005 | Kim et al. |
| 2005/0138063 A1 | 6/2005 | Bazot et al. |
| 2005/0144002 A1 | 6/2005 | Ps |
| 2005/0144022 A1 | 6/2005 | Evans |
| 2005/0152344 A1 | 7/2005 | Chiu et al. |
| 2005/0154580 A1 | 7/2005 | Horowitz et al. |
| 2005/0154969 A1 | 7/2005 | Bodin et al. |
| 2005/0190897 A1 | 9/2005 | Eberle et al. |
| 2005/0195999 A1 | 9/2005 | Takemura et al. |
| 2005/0203887 A1 | 9/2005 | Joshi et al. |
| 2005/0203959 A1 | 9/2005 | Muller et al. |
| 2005/0203960 A1* | 9/2005 | Suarez et al. .................. 707/200 |
| 2005/0232242 A1 | 10/2005 | Karaoguz et al. |
| 2005/0234727 A1 | 10/2005 | Chiu |
| 2005/0251513 A1 | 11/2005 | Tenazas |
| 2005/0261905 A1 | 11/2005 | Pyo et al. |
| 2005/0262119 A1* | 11/2005 | Mawdsley ..................... 707/100 |
| 2005/0286705 A1 | 12/2005 | Contolini et al. |
| 2005/0288926 A1 | 12/2005 | Benco et al. |
| 2006/0008252 A1 | 1/2006 | Kim |
| 2006/0008258 A1 | 1/2006 | Kawana et al. |
| 2006/0020662 A1 | 1/2006 | Robinson |
| 2006/0031447 A1 | 2/2006 | Holt et al. |
| 2006/0041549 A1 | 2/2006 | Gundersen et al. |
| 2006/0048212 A1 | 3/2006 | Tsuruoka et al. |
| 2006/0050794 A1 | 3/2006 | Tan et al. |
| 2006/0050996 A1 | 3/2006 | King et al. |
| 2006/0052089 A1 | 3/2006 | Khurana et al. |
| 2006/0075224 A1 | 4/2006 | Tao |
| 2006/0085199 A1 | 4/2006 | Jain |
| 2006/0095848 A1 | 5/2006 | Naik |
| 2006/0100877 A1 | 5/2006 | Zhang et al. |
| 2006/0112844 A1 | 6/2006 | Hiller et al. |
| 2006/0114987 A1 | 6/2006 | Roman |
| 2006/0123082 A1 | 6/2006 | Digate et al. |
| 2006/0129403 A1 | 6/2006 | Liao et al. |
| 2006/0136449 A1 | 6/2006 | Parker et al. |
| 2006/0140360 A1 | 6/2006 | Crago et al. |
| 2006/0149781 A1 | 7/2006 | Blankinship |
| 2006/0155698 A1 | 7/2006 | Vayssiere |
| 2006/0159109 A1 | 7/2006 | Lamkin et al. |
| 2006/0165104 A1 | 7/2006 | Kaye |
| 2006/0168507 A1 | 7/2006 | Hansen |
| 2006/0173985 A1 | 8/2006 | Moore |
| 2006/0184679 A1 | 8/2006 | Izdepski et al. |
| 2006/0190616 A1 | 8/2006 | Mayerhofer et al. |
| 2006/0193450 A1 | 8/2006 | Flynt et al. |
| 2006/0200743 A1 | 9/2006 | Thong et al. |
| 2006/0206533 A1 | 9/2006 | MacLaurin et al. |
| 2006/0224739 A1 | 10/2006 | Anantha |
| 2006/0233327 A1 | 10/2006 | Roberts et al. |
| 2006/0242663 A1 | 10/2006 | Gogerty |
| 2006/0253699 A1 | 11/2006 | Della-Libera et al. |
| 2006/0265503 A1 | 11/2006 | Jones et al. |
| 2006/0282317 A1 | 12/2006 | Rosenberg |
| 2006/0282822 A1 | 12/2006 | Weng |
| 2006/0287745 A1 | 12/2006 | Richenstein et al. |
| 2006/0288011 A1 | 12/2006 | Gandhi et al. |
| 2007/0005339 A1 | 1/2007 | Jaquinta |
| 2007/0027692 A1* | 2/2007 | Sharma et al. .............. 704/270.1 |
| 2007/0027859 A1 | 2/2007 | Harney et al. |
| 2007/0027958 A1 | 2/2007 | Haslam |
| 2007/0043462 A1 | 2/2007 | Terada et al. |
| 2007/0043735 A1 | 2/2007 | Bodin et al. |
| 2007/0043758 A1 | 2/2007 | Bodin et al. |
| 2007/0043759 A1 | 2/2007 | Bodin et al. |
| 2007/0061132 A1 | 3/2007 | Bodin et al. |
| 2007/0061229 A1 | 3/2007 | Ramer et al. |
| 2007/0061266 A1 | 3/2007 | Moore et al. |
| 2007/0061371 A1 | 3/2007 | Bodin et al. |
| 2007/0061401 A1 | 3/2007 | Bodin et al. |
| 2007/0061711 A1 | 3/2007 | Bodin et al. |
| 2007/0061712 A1 | 3/2007 | Bodin et al. |
| 2007/0073728 A1 | 3/2007 | Klein et al. |
| 2007/0077921 A1 | 4/2007 | Hayashi et al. |
| 2007/0078655 A1 | 4/2007 | Semkow et al. |
| 2007/0083540 A1 | 4/2007 | Gundla et al. |
| 2007/0091206 A1 | 4/2007 | Bloebaum |
| 2007/0100628 A1 | 5/2007 | Bodin et al. |
| 2007/0100629 A1 | 5/2007 | Bodin et al. |
| 2007/0100787 A1 | 5/2007 | Lim et al. |
| 2007/0100836 A1 | 5/2007 | Eichstaedt et al. |
| 2007/0101274 A1 | 5/2007 | Kurlander et al. |
| 2007/0101313 A1 | 5/2007 | Bodin et al. |
| 2007/0112844 A1 | 5/2007 | Tribble et al. |
| 2007/0118426 A1 | 5/2007 | Barnes, Jr. |
| 2007/0124458 A1 | 5/2007 | Kumar |
| 2007/0124802 A1 | 5/2007 | Anton et al. |
| 2007/0130589 A1 | 6/2007 | Davis et al. |
| 2007/0138999 A1 | 6/2007 | Lee et al. |
| 2007/0147274 A1 | 6/2007 | Vasa et al. |
| 2007/0165538 A1 | 7/2007 | Bodin et al. |
| 2007/0168191 A1 | 7/2007 | Bodin et al. |
| 2007/0168194 A1 | 7/2007 | Bodin et al. |
| 2007/0174326 A1 | 7/2007 | Schwartz et al. |
| 2007/0191008 A1 | 8/2007 | Bucher et al. |
| 2007/0192327 A1 | 8/2007 | Bodin et al. |
| 2007/0192672 A1 | 8/2007 | Bodin et al. |
| 2007/0192673 A1 | 8/2007 | Bodin et al. |
| 2007/0192674 A1 | 8/2007 | Bodin et al. |

(56) References Cited

U.S. PATENT DOCUMENTS

| | | | |
|---|---|---|---|
| 2007/0192675 A1 | 8/2007 | Bodin et al. |
| 2007/0192676 A1 | 8/2007 | Bodin et al. |
| 2007/0192683 A1 | 8/2007 | Bodin et al. |
| 2007/0192684 A1 | 8/2007 | Bodin et al. |
| 2007/0198267 A1 | 8/2007 | Jones et al. |
| 2007/0208687 A1 | 9/2007 | O'Conor et al. |
| 2007/0213857 A1 | 9/2007 | Bodin et al. |
| 2007/0213986 A1 | 9/2007 | Bodin et al. |
| 2007/0214147 A1 | 9/2007 | Bodin et al. |
| 2007/0214148 A1 | 9/2007 | Bodin et al. |
| 2007/0214149 A1 | 9/2007 | Bodin et al. |
| 2007/0214485 A1 | 9/2007 | Bodin et al. |
| 2007/0220024 A1 | 9/2007 | Putterman et al. |
| 2007/0239837 A1 | 10/2007 | Jablokov et al. |
| 2007/0253699 A1 | 11/2007 | Yen et al. |
| 2007/0276837 A1 | 11/2007 | Bodin et al. |
| 2007/0276865 A1 | 11/2007 | Bodin et al. |
| 2007/0276866 A1 | 11/2007 | Bodin et al. |
| 2007/0277088 A1 | 11/2007 | Bodin et al. |
| 2007/0277233 A1 | 11/2007 | Bodin et al. |
| 2008/0034278 A1 | 2/2008 | Tsou et al. |
| 2008/0052415 A1 | 2/2008 | Kellerman et al. |
| 2008/0082576 A1 | 4/2008 | Bodin et al. |
| 2008/0082635 A1 | 4/2008 | Bodin et al. |
| 2008/0155616 A1 | 6/2008 | Logan et al. |
| 2008/0161948 A1 | 7/2008 | Bodin et al. |
| 2008/0162131 A1 | 7/2008 | Bodin et al. |
| 2008/0162559 A1 | 7/2008 | Bodin et al. |
| 2008/0275893 A1 | 11/2008 | Bodin et al. |
| 2009/0271178 A1 | 10/2009 | Bodin et al. |

FOREIGN PATENT DOCUMENTS

| | | |
|---|---|---|
| CN | 1298173 | 6/2001 |
| CN | 1298173 A | 6/2001 |
| CN | 1368719 A | 4/2008 |
| CN | 1368719 C | 4/2008 |
| EP | 1197884 A2 | 4/2002 |
| GB | 2369955 | 6/2002 |
| KR | 2001-0071517 | 7/2001 |
| KR | 102001007151 | 7/2001 |
| KR | 2004-0078888 | 9/2004 |
| KR | 102004007888 | 9/2004 |
| WO | WO 0182139 | 11/2001 |
| WO | WO 0106846 | 11/2005 |

OTHER PUBLICATIONS

Barbara, et al.; "The Audio Web"; Proc. 6th Int. Conf. On Information and Knowledge Management; Jan. 1997; XP002352519; Las Vegas; Usa; pp. 97-104.
Office Action Dated Jun. 11, 2009 in Application U.S. Appl. No. 11/352,710.
Office Action Dated May 19, 2009 in Application U.S. Appl. No. 11/352,727.
Final Office Action Dated Apr. 20, 2009 in Application U.S. Appl. No. 11/266,559.
Final Office Action Dated Oct. 30, 2008 in Application U.S. Appl. No. 11/266,662.
Final Office Action Dated Apr. 06, 2009 in Application U.S. Appl. No. 11/266,675.
Final Office Action Dated Dec. 19, 2008 in Application U.S. Appl. No. 11/266,698.
Office Action Dated May 14, 2009 in Application U.S. Appl. No. 11/352,709.
Final Office Action Dated Apr. 29, 2008 in Application U.S. Appl. No. 11/207,911.
Final Office Action Dated Apr. 15, 2009 in Application U.S. Appl. No. 11/207,911.
Final Office Action Dated Sep. 25, 2008 in Application U.S. Appl. No. 11/226,747.
Final Office Action Dated May 07, 2008 in Application U.S. Appl. No. 11/226,744.
Final Office Action Dated May 07, 2008 in Application U.S. Appl. No. 11/207,912.
Final Office Action Dated Apr. 28, 2009 in Application U.S. Appl. No. 11/207,912.
Final Office Action Dated Sep. 16, 2008 in Application U.S. Appl. No. 11/266,663.
Final Office Action Dated Mar. 30, 2009 in Application U.S. Appl. No. 11/331,694.
Final Office Action Dated Feb. 09, 2009 in Application U.S. Appl. No. 11/331,692.
Final Office Action Dated May 07, 2008 in Application U.S. Appl. No. 11/207,914.
Final Office Action Dated Apr. 14, 2009 in Application U.S. Appl. No. 11/207,914.
Final Office Action Dated Dec. 23, 2008 in Application U.S. Appl. No. 11/207,913.
Final Office Action Dated Sep. 15, 2008 in Application U.S. Appl. No. 11/226,746.
Office Action Dated Jan. 25, 2010 in Application U.S. Appl. No. 11/207,912.
Notice of Allowance Dated Feb. 03, 2010 in Application U.S. Appl. No. 11/207,911.
Final Office Action Dated Jul. 31, 2009 in Application U.S. Appl. No. 11/226,746.
Office Action Dated Jan. 25, 2010 in Application U.S. Appl. No. 11/226,746.
Final Office Action Dated Nov. 05, 2009 in Application U.S. Appl. No. 11/352,709.
Braun N. & Doner R.; "Using Sonic Hyperlinks in Web-Tv"; International Conf. On Auditory Displays (Icad '98), 01 Nov. 1998; Xp 002428659; Glasgow, Uk; Cited by examiner in Final Office Action Dated Nov. 05, 2009 in Application U.S. Appl. No. 11/352,746 Reference Not Provided.
Hoschka, et al.; "Synchronized Multimedia Integration Language (Smil) 1.0 Specification"; 09 Apr. 1998; doi: http://www.w3.org/Tr/1998/Pr-smil-19980409/#anchor.
Casalaina, et al.; "Bmrc Procedures: RealMedia Guide"; doi: http://web.archive.org/web/20030218131051/http://bmrc.berkeley.edu/info/procedures/rm.html.
Office Action Dated Apr. 29, 2009 in Application U.S. Appl. No. 11/352,698.
Office Action Dated Aug. 17, 2009 in Application U.S. Appl. No. 11/331,692.
Mohan et al. "Adapting Multimedia Internet Content for Universal Access." IBM T.J Watson Research Center, pp. 1-35.
Lu et al., "Audio Ticker". WWW7 / Computer Networks 30(1-7): 721-722 (1998).
http://webarchive.org/web/20031203063919/http://eastbaytech.com/im.htm.
http://,vvwwodiogocorn.
FeedForAll at http://web.archive.org/web/20050813012521/http://www.feedforall.com/itune-tutorial-tags.htm.
Internet Archive for FeedForAll at h# :// eb, hive,or /webr/htt :Ian . eed r 1, ii ne- .11-qm-bi- acslitm.
Audioblog at httpliweb.archive.orgiweb/20040923235033.
Zhang, Liang-Jie, et al., "XML-Based Advanced Uddi Search Mechanism for B2B Integration", Electronic Commerce Research, vol. 3, Nos. 1-2, Jan. 2003, pp. 24-42.
He Tian, et al., "Aida: Adaptive Application-Independent Data Aggregation in Wireless Sensor Networks", Tecs, vol. 3, Issue 2, May 2004, pp. 426-457.
Braun N. Doner R: "Using Sonic Hyperlinks in Web-Tv," International Conf on Auditory Displays (Icad '98), Nov. 1, 1998, XP002428659, Glasgow, Uk.
Braun n. et al: "Temporal hypermedia for multimedia applications in the World Wide Web," Computational Intelligence and Multimedia Applications, 1999. Iccima '99. Third International Conference on New Delhi, India, Sep. 23-23, 1999. Los Alamitos, Ca Use, IEEE Comput. Sac, US, 23 Sep. 1999, XP010355646 Isbn: 0/7695-0300-4.
Frankie James: "Aha: audio Html access" Computer Networks and Isdn Systems, vol. 209, no. 8-13, Sep. 1997, pp. 1395-1404, XP002430654.

(56) References Cited

OTHER PUBLICATIONS

PCT Search Report, 09-02-07; PCT Application no. PCT/EP2007/051260.
"Adapting Multimedia Internet Content for Universal Access'" Rakesh Mohan, John R. Smith, Chung-Sheng Li, IEEE Transactions on Multimedia vol. 1, pg. 104 -114.
Buchanan et al.;"Representing Aggregated Works in the Digital Library", Acm, 2007, pp247-256.
Text to Speech MP3 with Natural Voices 1.71, Published Oct. 5,2004.
Managing Multimedia Content and Delivering Services Across Multiple client Platforms using XML, London Communications Symposium, xx, xx, 10 Sep. 2002, pgs. 1-7.
PCT Search Report and Written Opinion International Application PCT/EP2007/050594.
11/352,680 Office Action mailed Jun. 23, 2006.
11/372,317 Office Action mailed Jul. 08, 2009.
11/536,733 Foa mailed Jul. 22, 2009.
11/420,017 Office Action mailed Jul. 09, 2009.
11/536,781 Office Action mailed Jul. 17, 2009.
11/420,014 Office Action mailed Jul. 23, 2009.
11/420,018 Final Office Action mailed Jul. 21, 2009.
11/352,760 Office Action mailed Apr. 15, 2009.
11/352,760 Final Office Action mailed 11116/2009.
11/352,824 Notice of Allowance mailed Jun. 05, 2008.
11/352,824 Office Action mailed Jan. 22, 2008.
11/352,680 Final Office Action mailed Dec. 21, 2009.
11/352,679 Office Action mailed Apr. 30, 2009.
11/352,679 Final Office Action mailed Oct. 29, 2009.
11/372,323 Office Action mailed Oct. 28, 2008.
11/372,318 Office Action mailed Mar. 18, 2008.
11/372,318 Final Office Action mailed Jul. 09, 2008.
11/372,329 Final Office Action mailed Nov. 06, 2009.
11/372,325 Office Action mailed Feb. 25, 2009.
11/372,329 Office Action mailed Feb. 27, 2009.
11/536,781 Final Office Action mailed Jan. 15, 2010.
11/420,015 Office Action mailed Mar. 20, 2008.
111420,015 Final Office Action mailed Sep. 03, 2008.
11/420,015 Office Action mailed Dec. 02, 2008.
11/420,016 Office Action mailed Mar. 03, 2008.
111420,016 Final Office Action mailed Aug. 29, 2008.
111420,017 Final Office Action mailed Dec. 31, 2009.
11/420,018 Office Action mailed Mar. 21, 2008.
11/420,018 Final Office Action mailed Aug. 29, 2008.
11/420,018 Office Action mailed Dec. 03, 2008.
11/536,733 Office Action mailed Dec. 30, 2008.
11/619,216 Office Action mailed Jan. 26, 2010.
11/619,253 Office Action mailed Apr. 02, 2009.
11/352,760 Office Action mailed Sep. 16, 2010.
11/352,680 Office Action mailed Jun. 10, 2010.
111352,680 Final Office Action mailed Sep. 07, 2010.
111352,679 Office Action mailed May 28, 2010.
11/352,679 Final Office Action mailed Nov. 15, 2010.
11/372,317 Office Action mailed Sep. 23, 2010.
11/372,319 Office Action mailed Apr. 21, 2010.
11/372,319 Final Office Action mailed Jul. 02, 2010.
11/420,017 Final Office Action mailed Apr. 03, 2010.
11/420,017 Final Office Action mailed Sep. 23, 2010.
111619,216 Final Office Action mailed Jun. 25, 2010.
111619,236 Final Office Action mailed Oct. 22, 2010.
12/178,448 Office Action mailed Apr. 02, 2010.
12/178,448 Final Office Action mailed Sep. 14, 2010.

* cited by examiner

SYNTHESIZING AGGREGATE DATA OF DISPARATE DATA TYPES INTO DATA OF A UNIFORM DATA TYPE

BACKGROUND OF THE INVENTION

1. Field of the Invention

The field of the invention is data processing, or, more specifically, methods, systems, and products for synthesizing aggregated data of disparate data types into data of a uniform data type.

2. Description Of Related Art

Despite having more access to data and having more devices to access that data, users are often time constrained. One reason for this time constraint is that users typically must access data of disparate data types from disparate data sources on data type-specific devices using data type-specific applications. One or more such data type-specific devices may be cumbersome for use at a particular time due to any number of external circumstances. Examples of external circumstances that may make data type-specific devices cumbersome to use include crowded locations, uncomfortable locations such as a train or car, user activity such as walking, visually intensive activities such as driving, and others as will occur to those of skill in the art. There is therefore an ongoing need for data management and data rendering for disparate data types that provides access to uniform data type access to content from disparate data sources.

SUMMARY OF THE INVENTION

Methods, systems, and products are disclosed for synthesizing the aggregated data of disparate data types into data of a uniform data type which includes receiving aggregated data of disparate data types and translating each of the aggregated data of disparate data types into text content and markup associated with the text content. Synthesizing the aggregated data of disparate data types into data of a uniform data type may also include dynamically creating grammar sets for the text content and associating the grammar sets with the text content. Associating the grammar sets with the text content includes inserting markup in the translated data.

Dynamically creating grammar sets for the text content may include identifying keywords in the translated data and creating grammars in dependence upon the keywords and grammar creation rules. Dynamically creating grammar sets for the text content may also include associating an action with the grammar. Identifying keywords in the translated data may include identifying keywords determinative of content and identifying keywords determinative of logical structure.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
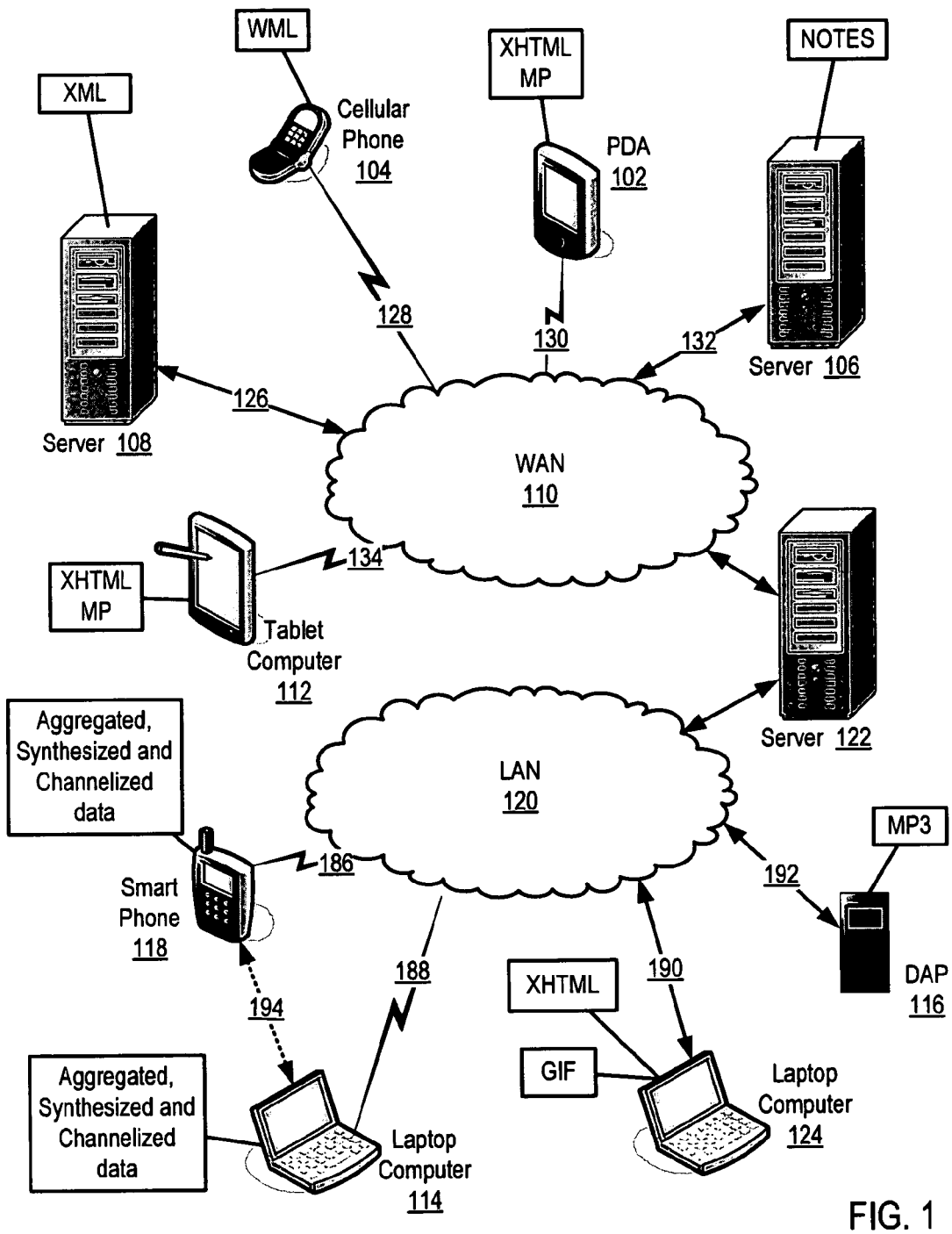
FIG. 1 sets forth a network diagram illustrating an exemplary system for data management and data rendering for disparate data types according to embodiments of the present invention.

Exemplary methods, systems, and products for data management and data rendering for disparate data types from disparate data sources according to embodiments of the present invention are described with reference to the accompanying drawings, beginning with FIG. 1. FIG. 1 sets forth a network diagram illustrating an exemplary system for data management and data rendering for disparate data types according to embodiments of the present invention. The system of FIG. 1 operates generally to manage and render data for disparate data types according to embodiments of the present invention by aggregating data of disparate data types from disparate data sources, synthesizing the aggregated data of disparate data types into data of a uniform data type, identifying an action in dependence upon the synthesized data, and executing the identified action.

Disparate data types are data of different kind and form. That is, disparate data types are data of different kinds. The distinctions in data that define the disparate data types may include a difference in data structure, file format, protocol in which the data is transmitted, and other distinctions as will occur to those of skill in the art. Examples of disparate data types include MPEG-1 Audio Layer 3 ('MP3') files, Extensible markup language documents ('XML'), email documents, and so on as will occur to those of skill in the art. Disparate data types typically must be rendered on data type-specific devices. For example, an MPEG-1 Audio Layer 3 ('MP3') file is typically played by an MP3 player, a Wireless Markup Language ('WML') file is typically accessed by a wireless device, and so on.

The term disparate data sources means sources of data of disparate data types. Such data sources may be any device or network location capable of providing access to data of a disparate data type. Examples of disparate data sources include servers serving up files, web sites, cellular phones, PDAs, MP3 players, and so on as will occur to those of skill in the art.

The system of FIG. 1 includes a number of devices operating as disparate data sources connected for data communications in networks. The data processing system of FIG. 1 includes a wide area network ("WAN") (110) and a local area network ("LAN") (120). "LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

In the example of FIG. 1, server (122) operates as a gateway between the LAN (120) and the WAN (110). The network connection aspect of the architecture of FIG. 1 is only for explanation, not for limitation. In fact, systems for data management and data rendering for disparate data types according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, a plurality of devices are connected to a LAN and WAN respectively, each implementing a data source and each having stored upon it data of a particular data type. In the example of FIG. 1, a server (108) is connected to the WAN through a wireline connection (126). The server (108) of FIG. 1 is a data source for an RSS feed, which the server delivers in the form of an XML file. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). The RSS formats provide web content or summaries of web content together with links to the full versions of the content, and other meta-data. This information is delivered as an XML file called RSS feed, webfeed, RSS stream, or RSS channel.

In the example of FIG. 1, another server (106) is connected to the WAN through a wireline connection (132). The server (106) of FIG. 1 is a data source for data stored as a Lotus NOTES file. In the example of FIG. 1, a personal digital assistant ('PDA') (102) is connected to the WAN through a wireless connection (130). The PDA is a data source for data stored in the form of an XHTML Mobile Profile ('XHTML MP') document.

In the example of FIG. 1, a cellular phone (104) is connected to the WAN through a wireless connection (128). The cellular phone is a data source for data stored as a Wireless Markup Language ('WML') file. In the example of FIG. 1, a tablet computer (112) is connected to the WAN through a wireless connection (134). The tablet computer (112) is a data source for data stored in the form of an XHTML MP document.

The system of FIG. 1 also includes a digital audio player ('DAP') (116). The DAP (116) is connected to the LAN through a wireline connection (192). The digital audio player ('DAP') (116) of FIG. 1 is a data source for data stored as an MP3 file. The system of FIG. 1 also includes a laptop computer (124). The laptop computer is connected to the LAN through a wireline connection (190). The laptop computer (124) of FIG. 1 is a data source data stored as a Graphics Interchange Format ('GIF') file. The laptop computer (124) of FIG. 1 is also a data source for data in the form of Extensible Hypertext Markup Language ('XHTML') documents.

The system of FIG. 1 includes a laptop computer (114) and a smart phone (118) each having installed upon it a data management and rendering module proving uniform access to the data of disparate data types available from the disparate data sources. The exemplary laptop computer (114) of FIG. 1 connects to the LAN through a wireless connection (188). The exemplary smart phone (118) of FIG. 1 also connects to the LAN through a wireless connection (186). The laptop computer (114) and smart phone (118) of FIG. 1 have installed and running on them software capable generally of data management and data rendering for disparate data types by aggregating data of disparate data types from disparate data sources; synthesizing the aggregated data of disparate data types into data of a uniform data type; identifying an action in dependence upon the synthesized data; and executing the identified action.

Aggregated data is the accumulation, in a single location, of data of disparate types. This location of the aggregated data may be either physical, such as, for example, on a single computer containing aggregated data, or logical, such as, for example, a single interface providing access to the aggregated data.

Synthesized data is aggregated data which has been synthesized into data of a uniform data type. The uniform data type may be implemented as text content and markup which has been translated from the aggregated data. Synthesized data may also contain additional voice markup inserted into the text content, which adds additional voice capability.

Alternatively, any of the devices of the system of FIG. 1 described as sources may also support a data management and rendering module according to the present invention. For example, the server (106), as described above, is capable of supporting a data management and rendering module providing uniform access to the data of disparate data types available from the disparate data sources. Any of the devices of FIG. 1, as described above, such as, for example, a PDA, a tablet computer, a cellular phone, or any other device as will occur to those of skill in the art, are capable of supporting a data management and rendering module according to the present invention.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

A method for data management and data rendering for disparate data types in accordance with the present invention is generally implemented with computers, that is, with automated computing machinery. In the system of FIG. 1, for example, all the nodes, servers, and communications devices are implemented to some extent at least as computers. For further explanation, therefore, FIG. 2 sets forth a block diagram of automated computing machinery comprising an exemplary computer (152) useful in data management and data rendering for disparate data types according to embodiments of the present invention. The computer (152) of FIG. 2 includes at least one computer processor (156) or 'CPU' as well as random access memory (168) ('RAM') which is connected through a system bus (160) to a processor (156) and to other components of the computer.

Stored in RAM (168) is a data management and data rendering module (140), computer program instructions for data management and data rendering for disparate data types capable generally of aggregating data of disparate data types from disparate data sources; synthesizing the aggregated data of disparate data types into data of a uniform data type; identifying an action in dependence upon the synthesized data; and executing the identified action. Data management and data rendering for disparate data types advantageously provides to the user the capability to efficiently access and manipulate data gathered from disparate data type-specific resources. Data management and data rendering for disparate data types also provides a uniform data type such that a user may access data gathered from disparate data type-specific resources on a single device.

Also stored in RAM (168) is an aggregation module (144), computer program instructions for aggregating data of disparate data types from disparate data sources capable generally of receiving, from an aggregation process, a request for data; identifying, in response to the request for data, one of two or more disparate data sources as a source for data; retrieving, from the identified data source, the requested data; and returning to the aggregation process the requested data. Aggregating data of disparate data types from disparate data sources advantageously provides the capability to collect data from multiple sources for synthesis.

Also stored in RAM is a synthesis engine (145), computer program instructions for synthesizing aggregated data of disparate data types into data of a uniform data type capable generally of receiving aggregated data of disparate data types and translating each of the aggregated data of disparate data types into translated data composed of text content and markup associated with the text content. Synthesizing aggregated data of disparate data types into data of a uniform data type advantageously provides synthesized data of a uniform data type which is capable of being accessed and manipulated by a single device.

Also stored in RAM (168) is an action generator module (159), a set of computer program instructions for identifying actions in dependence upon synthesized data and often user instructions. Identifying an action in dependence upon the synthesized data advantageously provides the capability of interacting with and managing synthesized data.

Also stored in RAM (168) is an action agent (158), a set of computer program instructions for administering the execution of one or more identified actions. Such execution may be executed immediately upon identification, periodically after identification, or scheduled after identification as will occur to those of skill in the art.

Also stored in RAM (168) is a dispatcher (146), computer program instructions for receiving, from an aggregation process, a request for data; identifying, in response to the request for data, one of a plurality of disparate data sources as a source for the data; retrieving, from the identified data source, the requested data; and returning, to the aggregation process, the requested data. Receiving, from an aggregation process, a request for data; identifying, in response to the request for data, one of a plurality of disparate data sources as a source for the data; retrieving, from the identified data source, the requested data; and returning, to the aggregation process, the requested data advantageously provides the capability to access disparate data sources for aggregation and synthesis.

Figure 2:
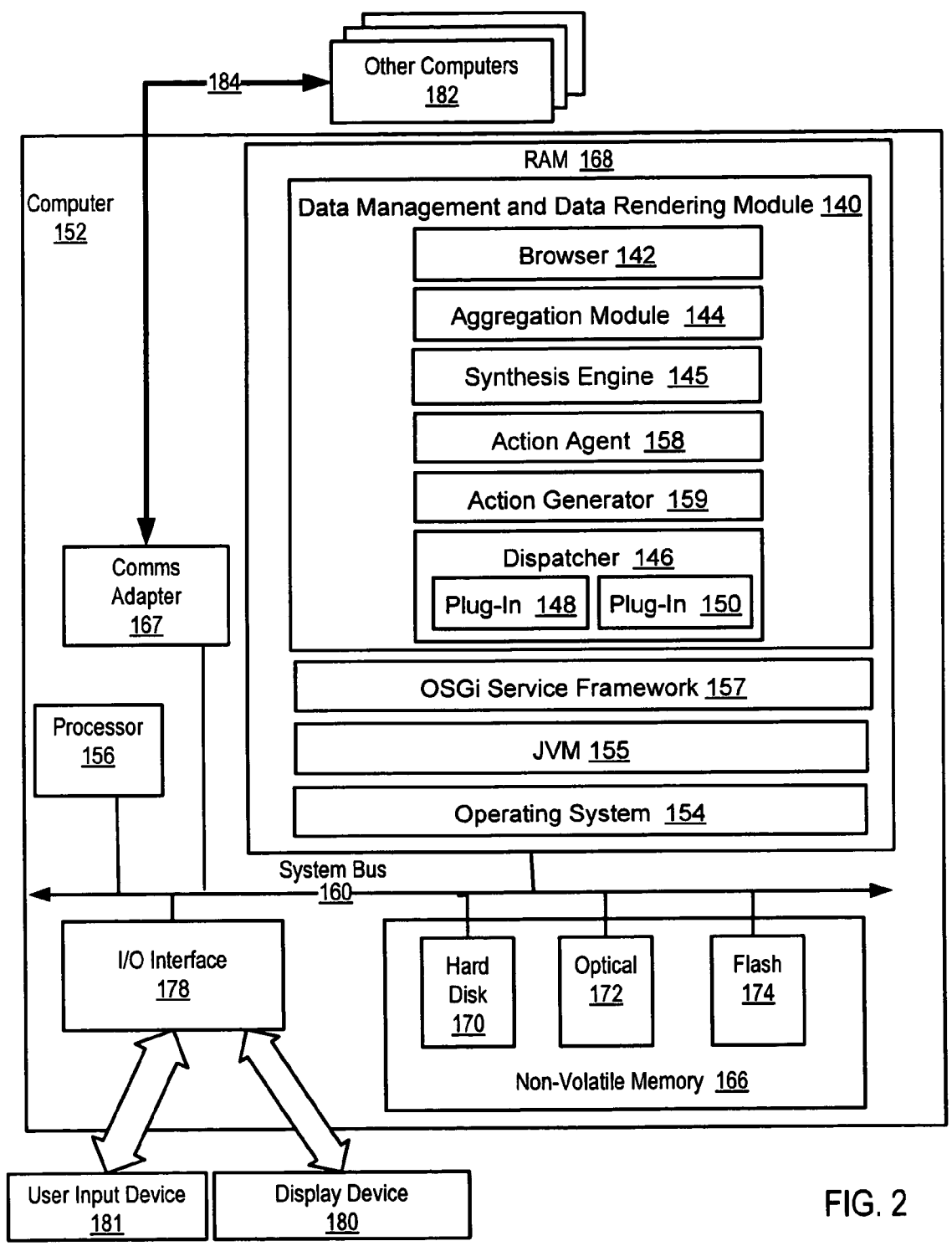
FIG. 2 sets forth a block diagram of automated computing machinery comprising an exemplary computer useful in data management and data rendering for disparate data types according to embodiments of the present invention.

The dispatcher (146) of FIG. 2 also includes a plurality of plug-in modules (148, 150), computer program instructions for retrieving, from a data source associated with the plug-in, requested data for use by an aggregation process. Such plug-ins isolate the general actions of the dispatcher from the specific requirements needed to retrieved data of a particular type.

Also stored in RAM (168) is a browser (142), computer program instructions for providing an interface for the user to synthesized data. Providing an interface for the user to synthesized data advantageously provides a user access to content of data retrieved from disparate data sources without having to use data source-specific devices. The browser (142) of FIG. 2 is capable of multimodal interaction capable of receiving multimodal input and interacting with users through multimodal output. Such multimodal browsers typically support multimodal web pages that provide multimodal interaction through hierarchical menus that may be speech driven.

Also stored in RAM is an OSGi Service Framework (157) running on a Java Virtual Machine ('JVM') (155). "OSGi" refers to the Open Service Gateway initiative, an industry organization developing specifications delivery of service bundles, software middleware providing compliant data communications and services through services gateways. The OSGi specification is a Java based application layer framework that gives service providers, network operator device makers, and appliance manufacturer's vendor neutral application and device layer APIs and functions. OSGi works with a variety of networking technologies like Ethernet, Bluetooth, the 'Home, Audio and Video Interoperability standard' (HAVi), IEEE 1394, Universal Serial Bus (USB), WAP, X-10, Lon Works, HomePlug and various other networking technologies. The OSGi specification is available for free download from the OSGi website at www.osgi.org.

An OSGi service framework (157) is written in Java and therefore, typically runs on a Java Virtual Machine (JVM) (155). In OSGi, the service framework (157) is a hosting platform for running 'services'. The term 'service' or 'services' in this disclosure, depending on context, generally refers to OSGi-compliant services.

Services are the main building blocks for creating applications according to the OSGi. A service is a group of Java classes and interfaces that implement a certain feature. The OSGi specification provides a number of standard services. For example, OSGi provides a standard HTTP service that creates a web server that can respond to requests from HTTP clients.

OSGi also provides a set of standard services called the Device Access Specification. The Device Access Specification ("DAS") provides services to identify a device connected to the services gateway, search for a driver for that device, and install the driver for the device.

Services in OSGi are packaged in 'bundles' with other files, images, and resources that the services need for execution. A bundle is a Java archive or 'JAR' file including one or more service implementations, an activator class, and a manifest file. An activator class is a Java class that the service framework uses to start and stop a bundle. A manifest file is a standard text file that describes the contents of the bundle.

The service framework (157) in OSGi also includes a service registry. The service registry includes a service registration including the service's name and an instance of a class that implements the service for each bundle installed on the framework and registered with the service registry. A bundle may request services that are not included in the bundle, but are registered on the framework service registry. To find a service, a bundle performs a query on the framework's service registry.

Data management and data rendering according to embodiments of the present invention may be usefully invoke one ore more OSGi services. OSGi is included for explanation and not for limitation. In fact, data management and data rendering according embodiments of the present invention may usefully employ many different technologies an all such technologies are well within the scope of the present invention.

Also stored in RAM (168) is an operating system (154). Operating systems useful in computers according to embodiments of the present invention include UNIX™, Linux™, Microsoft Windows NT™, AIX™, IBM's i5/OS™, and others as will occur to those of skill in the art. The operating system (154) and data management and data rendering module (140) in the example of FIG. 2 are shown in RAM (168), but many components of such software typically are stored in non-volatile memory (166) also.

Computer (152) of FIG. 2 includes non-volatile computer memory (166) coupled through a system bus (160) to a processor (156) and to other components of the computer (152). Non-volatile computer memory (166) may be implemented as a hard disk drive (170), an optical disk drive (172), an electrically erasable programmable read-only memory space (so-called 'EEPROM' or 'Flash' memory) (174), RAM drives (not shown), or as any other kind of computer memory as will occur to those of skill in the art.

The example computer of FIG. 2 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 2 includes a communications adapter (167) for implementing data communications (184) with other computers (182). Such data communications may be carried out serially through RS-232 connections, through external buses such as a USB, through data communications networks such as IP networks, and in other ways as will occur to those of skill in the art. Communications adapters implement the hardware level of data communications through which one computer sends data communications to another computer, directly or through a network. Examples of communications adapters useful for data management and data rendering for disparate data types from disparate data sources according to embodiments of the present invention include modems for wired dial-up communications, Ethernet (IEEE 802.3) adapters for wired network communications, and 802.11b adapters for wireless network communications.

Figure 3:
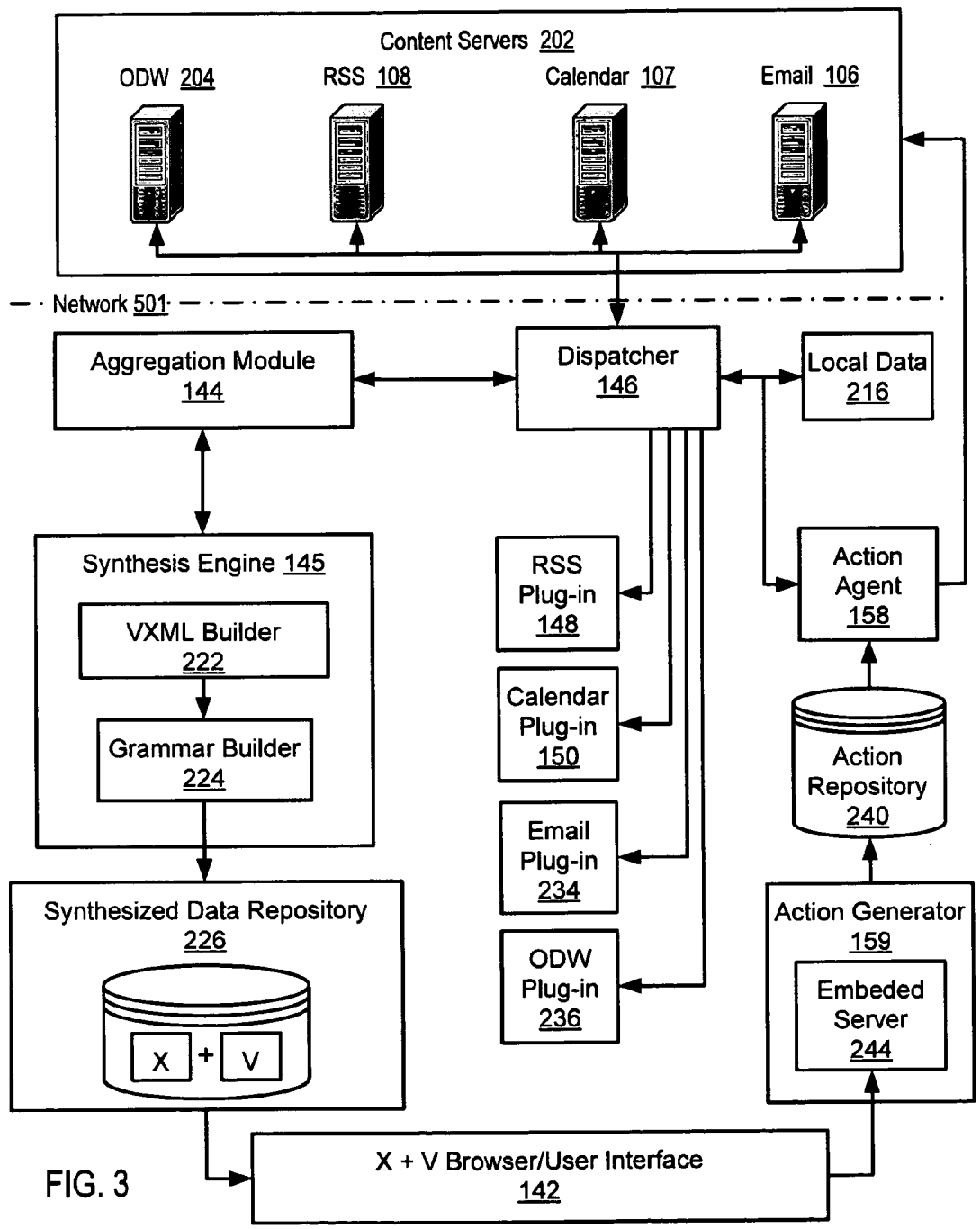
FIG. 3 sets forth a block diagram depicting a system for data management and data rendering for disparate data types according to of the present invention.

For further explanation, FIG. 3 sets forth a block diagram depicting a system for data management and data rendering for disparate data types according to of the present invention. The system of FIG. 3 includes an aggregation module (144), computer program instructions for aggregating data of disparate data types from disparate data sources capable generally of receiving, from an aggregation process, a request for data; identifying, in response to the request for data, one of two or more disparate data sources as a source for data; retrieving, from the identified data source, the requested data; and returning to the aggregation process the requested data.

The system of FIG. 3 includes a synthesis engine (145), computer program instructions for synthesizing aggregated data of disparate data types into data of a uniform data type capable generally of receiving aggregated data of disparate data types and translating each of the aggregated data of disparate data types into translated data composed of text content and markup associated with the text content.

The synthesis engine (145) includes a VXML Builder (222) module, computer program instructions for translating each of the aggregated data of disparate data types into text content and markup associated with the text content. The synthesis engine (145) also includes a grammar builder (224) module, computer program instructions for generating grammars for voice markup associated with the text content.

The system of FIG. 3 includes a synthesized data repository (226) data storage for the synthesized data created by the synthesis engine in X+V format. The system of FIG. 3 also includes an X+V browser (142), computer program instructions capable generally of presenting the synthesized data from the synthesized data repository (226) to the user. Presenting the synthesized data may include both graphical display and audio representation of the synthesized data. As discussed below with reference to FIG. 4, one way presenting the synthesized data to a user may be carried out is by presenting synthesized data through one or more channels.

The system of FIG. 3 includes a dispatcher (146) module, computer program instructions for receiving, from an aggregation process, a request for data; identifying, in response to the request for data, one of a plurality of disparate data sources as a source for the data; retrieving, from the identified data source, the requested data; and returning, to the aggregation process, the requested data. The dispatcher (146) module accesses data of disparate data types from disparate data sources for the aggregation module (144), the synthesis engine (145), and the action agent (158). The system of FIG. 3 includes data source-specific plug-ins (148-150, 234-236) used by the dispatcher to access data as discussed below.

In the system of FIG. 3, the data sources include local data (216) and content servers (202). Local data (216) is data contained in memory or registers of the automated computing machinery. In the system of FIG. 3, the data sources also include content servers (202). The content servers (202) are connected to the dispatcher (146) module through a network (501). An RSS server (108) of FIG. 3 is a data source for an RSS feed, which the server delivers in the form of an XML file. RSS is a family of XML file formats for web syndication used by news websites and weblogs. The abbreviation is used to refer to the following standards: Rich Site Summary (RSS 0.91), RDF Site Summary (RSS 0.9, 1.0 and 1.1), and Really Simple Syndication (RSS 2.0). The RSS formats provide web content or summaries of web content together with links to the full versions of the content, and other meta-data. This information is delivered as an XML file called RSS feed, webfeed, RSS stream, or RSS channel.

In the system of FIG. 3, an email server (106) is a data source for email. The server delivers this email in the form of a Lotus NOTES file. In the system of FIG. 3, a calendar server (107) is a data source for calendar information. Calendar information includes calendared events and other related information. The server delivers this calendar information in the form of a Lotus NOTES file.

In the system of FIG. 3, an IBM On Demand Workstation (204) a server providing support for an On Demand Workplace ('ODW') that provides productivity tools, and a virtual space to share ideas and expertise, collaborate with others, and find information.

The system of FIG. 3 includes data source-specific plug-ins (148-150, 234-236). For each data source listed above, the dispatcher uses a specific plug-in to access data.

The system of FIG. 3 includes an RSS plug-in (148) associated with an RSS server (108) running an RSS application. The RSS plug-in (148) of FIG. 3 retrieves the RSS feed from the RSS server (108) for the user and provides the RSS feed in an XML file to the aggregation module.

The system of FIG. 3 includes a calendar plug-in (150) associated with a calendar server (107) running a calendaring application. The calendar plug-in (150) of FIG. 3 retrieves calendared events from the calendar server (107) for the user and provides the calendared events to the aggregation module.

The system of FIG. 3 includes an email plug-in (234) associated with an email server (106) running an email application. The email plug-in (234) of FIG. 3 retrieves email from the email server (106) for the user and provides the email to the aggregation module.

The system of FIG. 3 includes an On Demand Workstation ('ODW') plug-in (236) associated with an ODW server (204) running an ODW application. The ODW plug-in (236) of FIG. 3 retrieves ODW data from the ODW server (204) for the user and provides the ODW data to the aggregation module.

The system of FIG. 3 also includes an action generator module (159), computer program instructions for identifying an action from the action repository (240) in dependence upon the synthesized data capable generally of receiving a user instruction, selecting synthesized data in response to the user instruction, and selecting an action in dependence upon the user instruction and the selected data.

The action generator module (159) contains an embedded server (244). The embedded server (244) receives user instructions through the X+V browser (142). Upon identifying an action from the action repository (240), the action generator module (159) employs the action agent (158) to execute the action. The system of FIG. 3 includes an action agent (158), computer program instructions for executing an action capable generally of executing actions.

Figure 4:
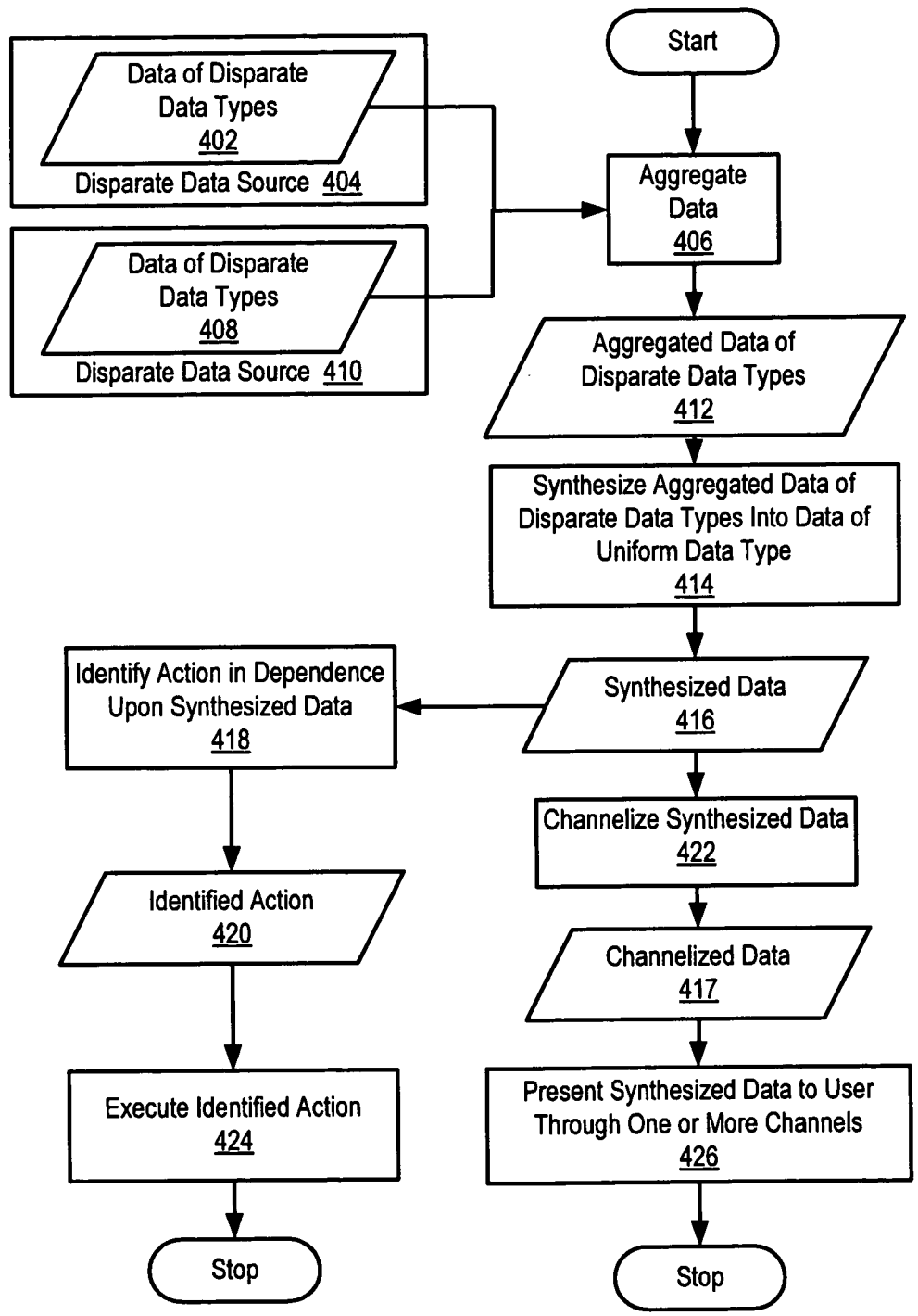
FIG. 4 sets forth a flow chart illustrating an exemplary method for data management and data rendering for disparate data types according to embodiments of the present invention.

For further explanation, FIG. 4 sets forth a flow chart illustrating an exemplary method for data management and data rendering for disparate data types according to embodiments of the present invention. The method of FIG. 4 includes aggregating (406) data of disparate data types (402, 408) from disparate data sources (404, 410). As discussed above, aggregated data of disparate data types is the accumulation, in a single location, of data of disparate types. This location of the aggregated data may be either physical, such as, for example, on a single computer containing aggregated data, or logical, such as, for example, a single interface providing access to the aggregated data.

Figure 5:
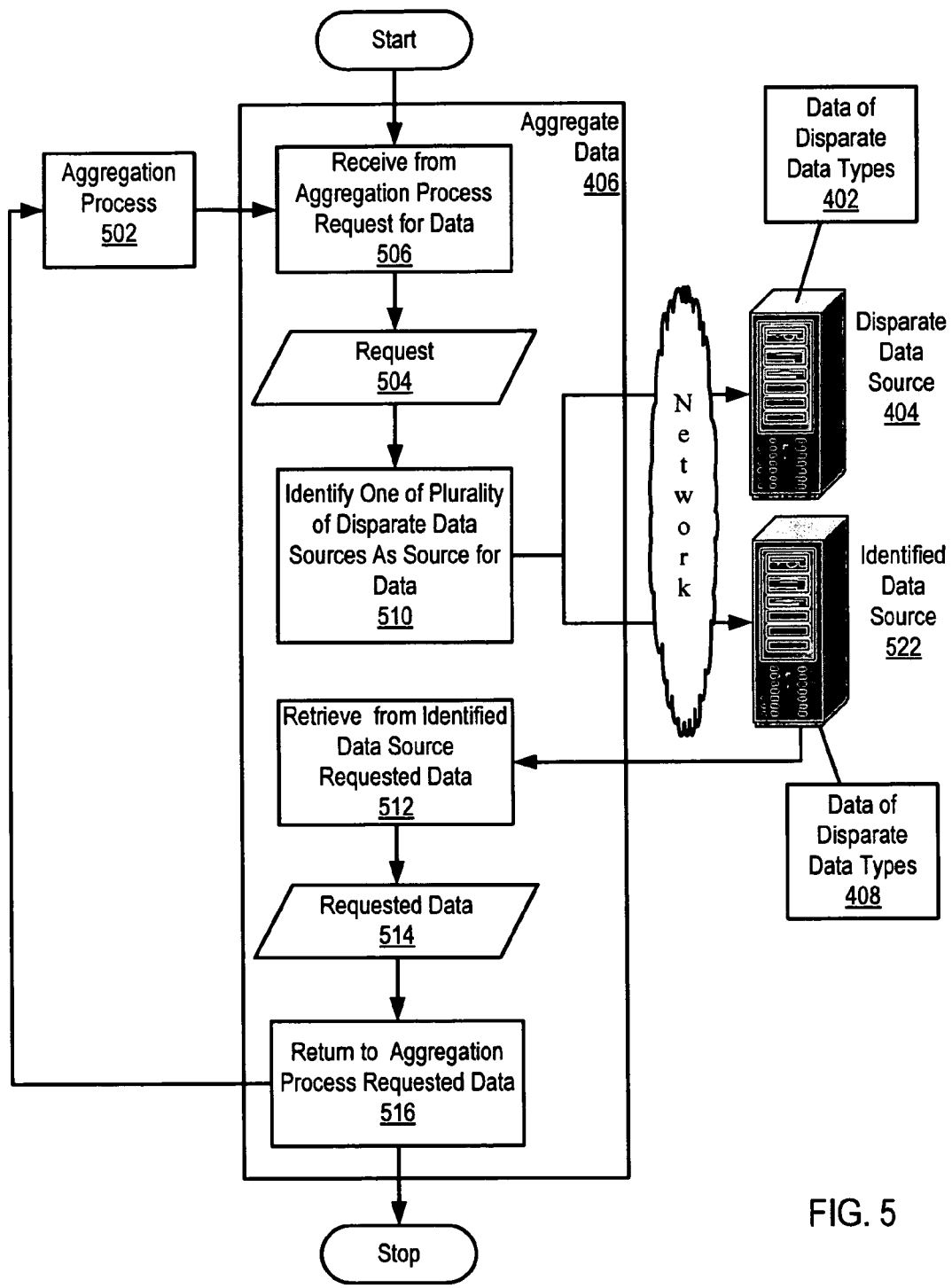
FIG. 5 sets forth a flow chart illustrating an exemplary method for aggregating data of disparate data types from disparate data sources according to embodiments of the present invention.

Aggregating (406) data of disparate data types (402, 408) from disparate data sources (404, 410) according to the method of FIG. 4 may be carried out by receiving, from an aggregation process, a request for data; identifying, in response to the request for data, one of two or more disparate data sources as a source for data; retrieving, from the identified data source, the requested data; and returning to the aggregation process the requested data as discussed in more detail below with reference to FIG. 5.

The method of FIG. 4 also includes synthesizing (414) the aggregated data of disparate data types (412) into data of a uniform data type. Data of a uniform data type is data having been created or translated into a format of predetermined type. That is, uniform data types are data of a single kind that may be rendered on a device capable of rendering data of the uniform data type. Synthesizing (414) the aggregated data of disparate data types (412) into data of a uniform data type advantageously results in a single point of access for the content of the aggregation of disparate data retrieved from disparate data sources.

One example of a uniform data type useful in synthesizing (414) aggregated data of disparate data types (412) into data of a uniform data type is XHTML plus Voice. XHTML plus Voice ('X+V') is a Web markup language for developing multimodal applications, by enabling voice in a presentation layer with voice markup. X+V provides voice-based interaction in small and mobile devices using both voice and visual elements. X+V is composed of three main standards: XHTML, VoiceXML, and XML Events. Given that the Web application environment is event-driven, X+V incorporates the Document Object Model (DOM) eventing framework used in the XML Events standard. Using this framework, X+V defines the familiar event types from HTML to create the correlation between visual and voice markup.

Synthesizing (414) the aggregated data of disparate data types (412) into data of a uniform data type may be carried out by receiving aggregated data of disparate data types and translating each of the aggregated data of disparate data types into text content and markup associated with the text content as discussed in more detail with reference to FIG. 9. In the method of FIG. 4, synthesizing the aggregated data of disparate data types (412) into data of a uniform data type may be carried out by translating the aggregated data into X+V, or any other markup language as will occur to those of skill in the art.

The method for data management and data rendering of FIG. 4 also includes identifying (418) an action in dependence upon the synthesized data (416). An action is a set of computer instructions that when executed carry out a predefined task. The action may be executed in dependence upon the synthesized data immediately or at some defined later time. Identifying (418) an action in dependence upon the synthesized data (416) may be carried out by receiving a user instruction, selecting synthesized data in response to the user instruction, and selecting an action in dependence upon the user instruction and the selected data.

A user instruction is an event received in response to an act by a user. Exemplary user instructions include receiving events as a result of a user entering a combination of keystrokes using a keyboard or keypad, receiving speech from a user, receiving an event as a result of clicking on icons on a visual display by using a mouse, receiving an event as a result of a user pressing an icon on a touchpad, or other user instructions as will occur to those of skill in the art. Receiving a user instruction may be carried out by receiving speech from a user, converting the speech to text, and determining in dependence upon the text and a grammar the user instruction. Alternatively, receiving a user instruction may be carried out by receiving speech from a user and determining the user instruction in dependence upon the speech and a grammar.

The method of FIG. 4 also includes executing (424) the identified action (420). Executing (424) the identified action (420) may be carried out by calling a member method in an action object identified in dependence upon the synthesized data, executing computer program instructions carrying out the identified action, as well as other ways of executing an identified action as will occur to those of skill in the art. Executing (424) the identified action (420) may also include determining the availability of a communications network required to carry out the action and executing the action only if the communications network is available and postponing executing the action if the communications network connection is not available. Postponing executing the action if the communications network connection is not available may include enqueuing identified actions into an action queue, storing the actions until a communications network is available, and then executing the identified actions. Another way that waiting to execute the identified action (420) may be carried out is by inserting an entry delineating the action into a container, and later processing the container. A container could be any data structure suitable for storing an entry delineating an action, such as, for example, an XML file.

Executing (424) the identified action (420) may include modifying the content of data of one of the disparate data sources. Consider for example, an action called deleteOldEmail( ) that when executed deletes not only synthesized data translated from email, but also deletes the original source email stored on an email server coupled for data communications with a data management and data rendering module operating according to the present invention.

The method of FIG. 4 also includes channelizing (422) the synthesized data (416). A channel is a logical aggregation of data content for presentation to a user. Channelizing (422) the synthesized data (416) may be carried out by identifying attributes of the synthesized data, characterizing the attributes of the synthesized data, and assigning the data to a predetermined channel in dependence upon the characterized attributes and channel assignment rules. Channelizing the synthesized data advantageously provides a vehicle for presenting related content to a user. Examples of such channelized data may be a 'work channel' that provides a channel of work related content, an 'entertainment channel' that provides a channel of entertainment content an so on as will occur to those of skill in the art.

The method of FIG. 4 may also include presenting (426) the synthesized data (416) to a user through one or more channels. One way presenting (426) the synthesized data (416) to a user through one or more channels may be carried out is by presenting summaries or headings of available channels. The content presented through those channels can be accessed via this presentation in order to access the synthesized data (416). Another way presenting (426) the synthesized data (416) to a user through one or more channels may be carried out by displaying or playing the synthesized data (416) contained in the channel. Text might be displayed visually, or it could be translated into a simulated voice and played for the user.

For further explanation, FIG. 5 sets forth a flow chart illustrating an exemplary method for aggregating data of disparate data types from disparate data sources according to embodiments of the present invention. In the method of FIG. 5, aggregating (406) data of disparate data types (402, 408) from disparate data sources (404, 522) includes receiving (506), from an aggregation process (502), a request for data (508). A request for data may be implemented as a message, from the aggregation process, to a dispatcher instructing the dispatcher to initiate retrieving the requested data and returning the requested data to the aggregation process.

In the method of FIG. 5, aggregating (406) data of disparate data types (402, 408) from disparate data sources (404, 522) also includes identifying (510), in response to the request for data (508), one of a plurality of disparate data sources (404, 522) as a source for the data. Identifying (510), in response to the request for data (508), one of a plurality of disparate data sources (404, 522) as a source for the data may be carried in a number of ways. One way of identifying (510) one of a plurality of disparate data sources (404, 522) as a source for the data may be carried out by receiving, from a user, an identification of the disparate data source; and identifying, to the aggregation process, the disparate data source in dependence upon the identification as discussed in more detail below with reference to FIG. 7.

Another way of identifying, to the aggregation process (502), disparate data sources is carried out by identifying, from the request for data, data type information and identifying from the data source table sources of data that correspond to the data type as discussed in more detail below with reference to FIG. 8. Still another way of identifying one of a plurality of data sources is carried out by identifying, from the request for data, data type information; searching, in dependence upon the data type information, for a data source; and identifying from the search results returned in the data source search, sources of data corresponding to the data type also discussed below in more detail with reference to FIG. 8.

The three methods for identifying one of a plurality of data sources described in this specification are for explanation and not for limitation. In fact, there are many ways of identifying one of a plurality of data sources and all such ways are well within the scope of the present invention.

The method for aggregating (406) data of FIG. 5 includes retrieving (512), from the identified data source (522), the requested data (514). Retrieving (512), from the identified data source (522), the requested data (514) includes determining whether the identified data source requires data access information to retrieve the requested data; retrieving, in dependence upon data elements contained in the request for data, the data access information if the identified data source requires data access information to retrieve the requested data; and presenting the data access information to the identified data source as discussed in more detail below with reference to FIG. 6. Retrieving (512) the requested data according the method of FIG. 5 may be carried out by retrieving the data from memory locally, downloading the data from a network location, or any other way of retrieving the requested data that will occur to those of skill in the art. As discussed above, retrieving (512), from the identified data source (522), the requested data (514) may be carried out by a data-source-specific plug-in designed to retrieve data from a particular data source or a particular type of data source.

In the method of FIG. 5, aggregating (406) data of disparate data types (402, 408) from disparate data sources (404, 522) also includes returning (516), to the aggregation process (502), the requested data (514). Returning (516), to the aggregation process (502), the requested data (514) returning the requested data to the aggregation process in a message, storing the data locally and returning a pointer pointing to the location of the stored data to the aggregation process, or any other way of returning the requested data that will occur to those of skill in the art.

Figure 6:
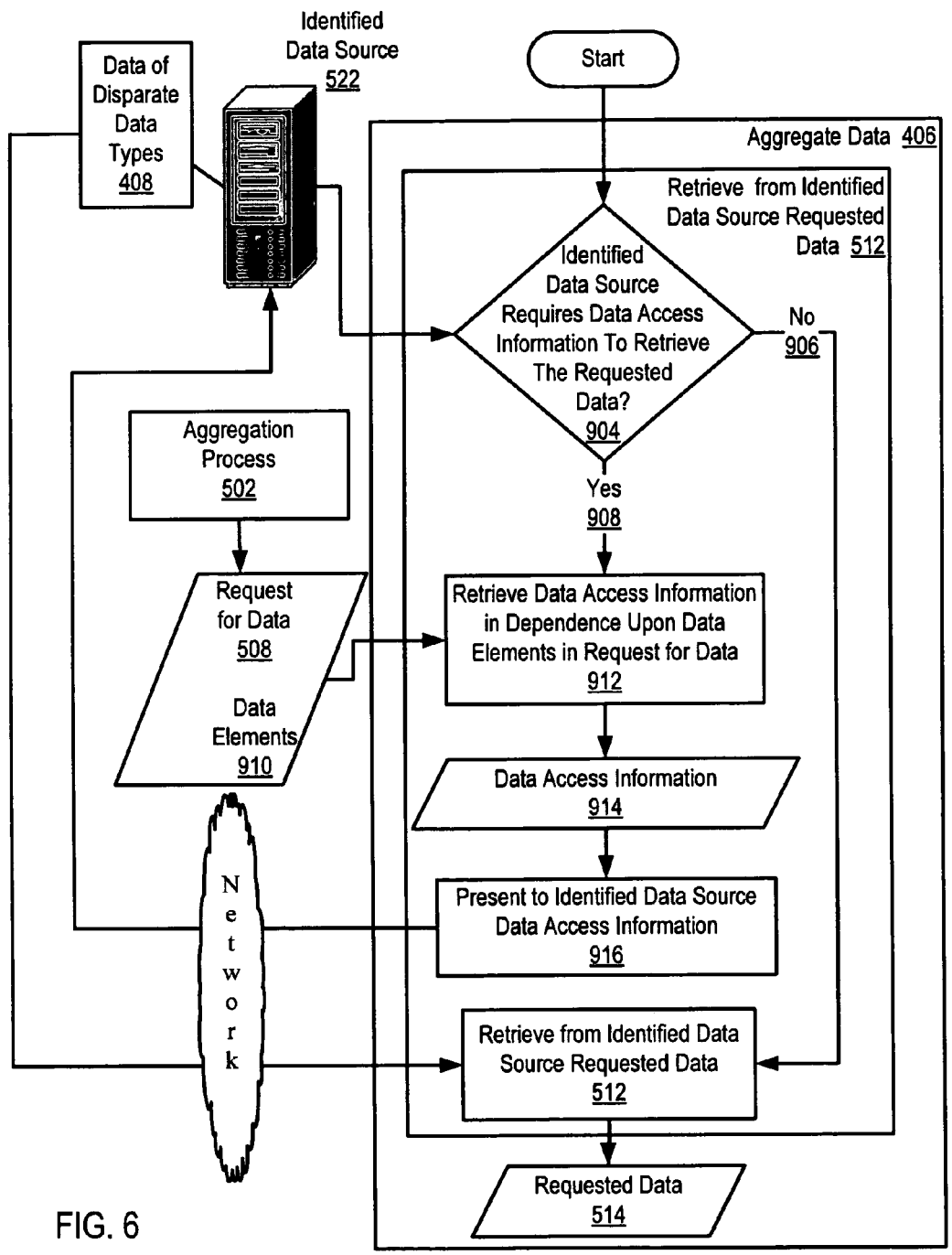
FIG. 6 sets forth a flow chart illustrating an exemplary method for retrieving, from the identified data source, the requested data according to embodiments of the present invention.

As discussed above with reference to FIG. 5, aggregating (406) data of FIG. 5 includes retrieving, from the identified data source, the requested data. For further explanation, therefore, FIG. 6 sets forth a flow chart illustrating an exemplary method for retrieving (512), from the identified data source (522), the requested data (514) according to embodiments of the present invention. In the method of FIG. 6, retrieving (512), from the identified data source (522), the requested data (514) includes determining (904) whether the identified data source (522) requires data access information (914) to retrieve the requested data (514). As discussed above in reference to FIG. 5, data access information is information which is required to access some types of data from some of the disparate sources of data. Exemplary data access information includes account names, account numbers, passwords, or any other data access information that will occur to those of skill in the art.

Determining (904) whether the identified data source (522) requires data access information (914) to retrieve the requested data (514) may be carried out by attempting to retrieve data from the identified data source and receiving from the data source a prompt for data access information required to retrieve the data. Alternatively, instead of receiving a prompt from the data source each time data is retrieved from the data source, determining (904) whether the identified data source (522) requires data access information (914) to retrieve the requested data (514) may be carried out once by, for example a user, and provided to a dispatcher such that the required data access information may be provided to a data source with any request for data without prompt. Such data access information may be stored in, for example, a data source table identifying any corresponding data access information needed to access data from the identified data source.

In the method of FIG. 6, retrieving (512), from the identified data source (522), the requested data (514) also includes retrieving (912), in dependence upon data elements (910) contained in the request for data (508), the data access information (914), if the identified data source requires data access information to retrieve the requested data (908). Data elements (910) contained in the request for data (508) are typically values of attributes of the request for data (508). Such values may include values identifying the type of data to be accessed, values identifying the location of the disparate data source for the requested data, or any other values of attributes of the request for data.

Such data elements (910) contained in the request for data (508) are useful in retrieving data access information required to retrieve data from the disparate data source. Data access information needed to access data sources for a user may be usefully stored in a record associated with the user indexed by the data elements found in all requests for data from the data source. Retrieving (912), in dependence upon data elements (910) contained in the request for data (508), the data access information (914) according to FIG. 6 may therefore be carried out by retrieving, from a database in dependence upon one or more data elements in the request, a record containing the data access information and extracting from the record the data access information. Such data access information may be provided to the data source to retrieve the data.

Retrieving (912), in dependence upon data elements (910) contained in the request for data (508), the data access information (914), if the identified data source requires data access information (914) to retrieve the requested data (908), may be carried out by identifying data elements (910) contained in the request for data (508), parsing the data elements to identify data access information (914) needed to retrieve the requested data (908), identifying in a data access table the correct data access information, and retrieving the data access information (914).

The exemplary method of FIG. 6 for retrieving (512), from the identified data source (522), the requested data (514) also includes presenting (916) the data access information (914) to the identified data source (522). Presenting (916) the data access information (914) to the identified data source (522) according to the method of FIG. 6 may be carried out by providing in the request the data access information as parameters to the request or providing the data access information in response to a prompt for such data access information by a data source. That is, presenting (916) the data access information (914) to the identified data source (522) may be carried out by a selected data source specific plug-in of a dispatcher that provides data access information (914) for the identified data source (522) in response to a prompt for such data access information. Alternatively, presenting (916) the data access information (914) to the identified data source (522) may be carried out by a selected data source specific plug-in of a dispatcher that passes as parameters to request the data access information (914) for the identified data source (522) without prompt.

Figure 7:
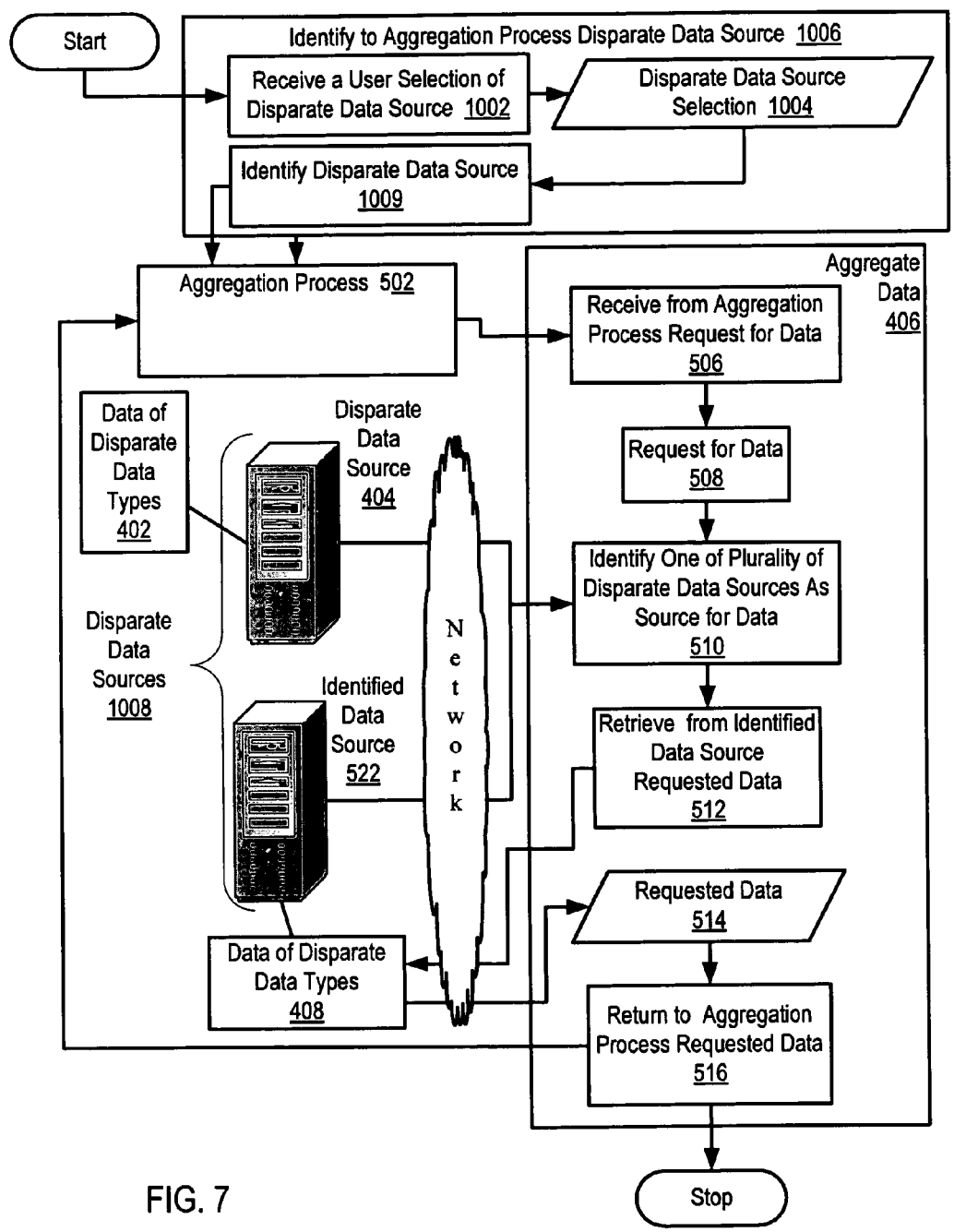
FIG. 7 sets forth a flow chart illustrating an exemplary method for aggregating data of disparate data types from disparate data sources according to the present invention.

As discussed above, aggregating data of disparate data types from disparate data sources according to embodiments of the present invention typically includes identifying, to the aggregation process, disparate data sources. That is, prior to requesting data from a particular data source, that data source typically is identified to an aggregation process. For further explanation, therefore, FIG. 7 sets forth a flow chart illustrating an exemplary method for aggregating data of disparate data types (404, 522) from disparate data sources (404, 522) according to the present invention that includes identifying (1006), to the aggregation process (502), disparate data sources (1008). In the method of FIG. 7, identifying (1006), to the aggregation process (502), disparate data sources (1008) includes receiving (1002), from a user, a selection (1004) of the disparate data source. A user is typically a person using a data management a data rendering system to manage and render data of disparate data types (402, 408) from disparate data sources (1008) according to the present invention. Receiving (1002), from a user, a selection (1004) of the disparate data source may be carried out by receiving, through a user interface of a data management and data rendering application, from the user a user instruction containing a selection of the disparate data source and identifying (1009), to the aggregation process (502), the disparate data source (404, 522) in dependence upon the selection (1004). A user instruction is an event received in response to an act by a user such as an event created as a result of a user entering a combination of keystrokes, using a keyboard or keypad, receiving speech from a user, receiving an clicking on icons on a visual display by using a mouse, pressing an icon on a touchpad, or other use act as will occur to those of skill in the art. A user interface in a data management and data rendering application may usefully provide a vehicle for receiving user selections of particular disparate data sources.

In the example of FIG. 7, identifying disparate data sources to an aggregation process is carried out by a user. Identifying disparate data sources may also be carried out by processes that require limited or no user interaction. For further explanation, FIG. 8 sets forth a flow chart illustrating an exemplary method for aggregating data of disparate data types from disparate data sources requiring little or no user action that includes identifying (1006), to the aggregation process (502), disparate data sources (1008) includes identifying (1102), from a request for data (508), data type information (1106). Disparate data types identify data of different kind and form. That is, disparate data types are data of different kinds. The distinctions in data that define the disparate data types may include a difference in data structure, file format, protocol in which the data is transmitted, and other distinctions as will occur to those of skill in the art. Data type information (1106) is information representing these distinctions in data that define the disparate data types.

Figure 8:
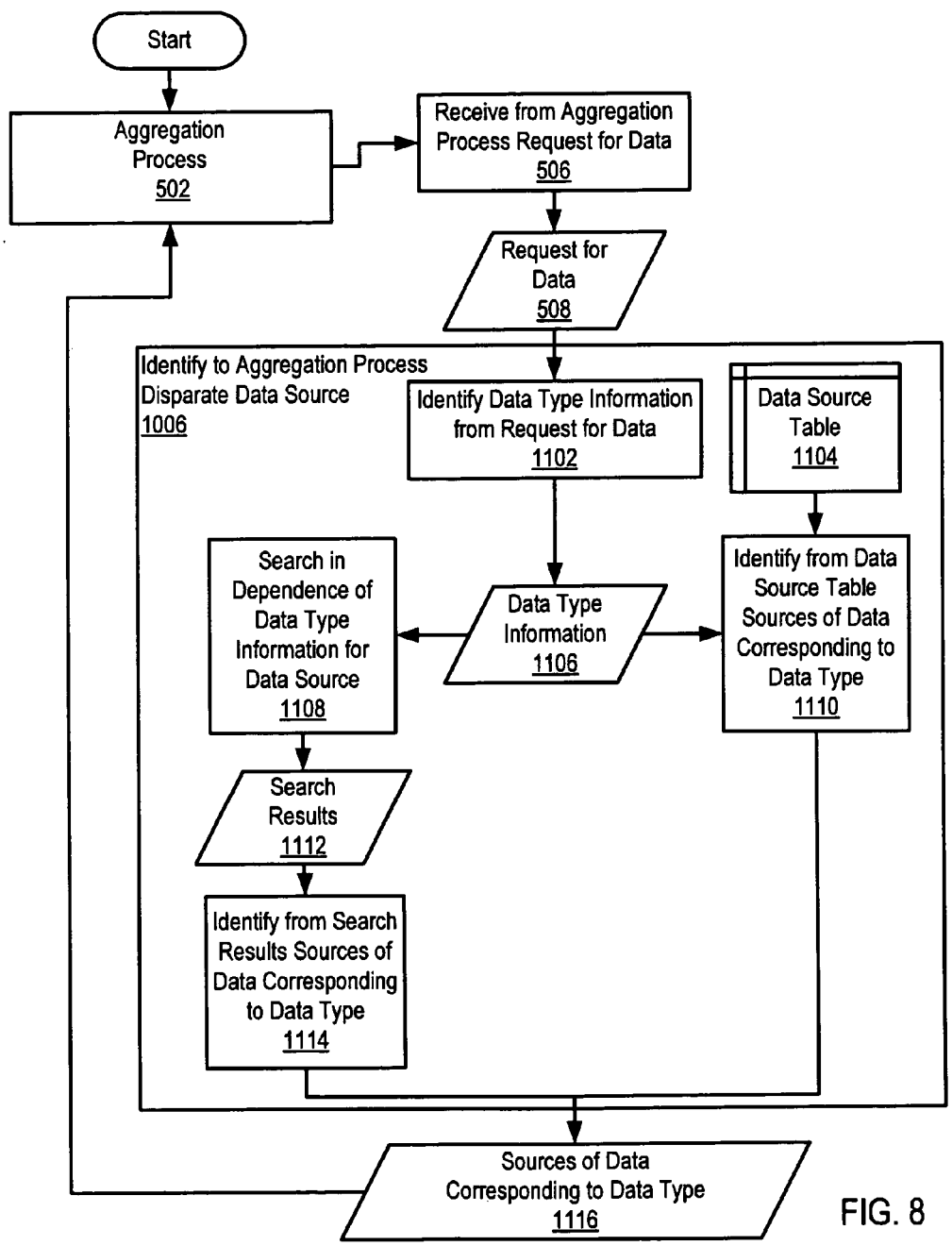
FIG. 8 sets forth a flow chart illustrating an exemplary method for aggregating data of disparate data types from disparate data sources according to the present invention.

Identifying (1102), from the request for data (508), data type information (1106) according to the method of FIG. 8 may be carried out by extracting a data type code from the request for data. Alternatively, identifying (1102), from the request for data (508), data type information (1106) may be carried out by inferring the data type of the data being requested from the request itself, such as by extracting data elements from the request and inferring from those data elements the data type of the requested data, or in other ways as will occur to those of skill in the art.

In the method for aggregating of FIG. 8, identifying (1006), to the aggregation process (502), disparate data sources also includes identifying (1110), from a data source table (1104), sources of data corresponding to the data type (1116). A data source table is a table containing identification of disparate data sources indexed by the data type of the data retrieved from those disparate data sources. Identifying (1110), from a data source table (1104), sources of data corresponding to the data type (1116) may be carried out by performing a lookup on the data source table in dependence upon the identified data type.

In some cases no such data source may be found for the data type or no such data source table is available for identifying a disparate data source. In the method of FIG. 8 therefore includes an alternative method for identifying (1006), to the aggregation process (502), disparate data sources that includes searching (1108), in dependence upon the data type information (1106), for a data source and identifying (1114), from search results (1112) returned in the data source search, sources of data corresponding to the data type (1116). Searching (1108), in dependence upon the data type information (1106), for a data source may be carried out by creating a search engine query in dependence upon the data type information and querying the search engine with the created query. Querying a search engine may be carried out through the use of URL encoded data passed to a search engine through, for example, an HTTP GET or HTTP POST function. URL encoded data is data packaged in a URL for data communications, in this case, passing a query to a search engine. In the case of HTTP communications, the HTTP GET and POST functions are often used to transmit URL encoded data. In this context, it is useful to remember that URLs do more than merely request file transfers. URLs identify resources on servers. Such resources may be files having filenames, but the resources identified by URLs also include, for example, queries to databases. Results of such queries do not necessarily reside in files, but they are nevertheless data resources identified by URLs and identified by a search engine and query data that produce such resources. An example of URL encoded data is:

http://www.example.com/search?field1=value1&field2=value2

This example of URL encoded data representing a query that is submitted over the web to a search engine. More specifically, the example above is a URL bearing encoded data representing a query to a search engine and the query is the string "field1=value1&field2=value2." The exemplary encoding method is to string field names and field values separated by '&' and "=" and designate the encoding as a query by including "search" in the URL. The exemplary URL encoded search query is for explanation and not for limitation. In fact, different search engines may use different syntax in representing a query in a data encoded URL and therefore the particular syntax of the data encoding may vary according to the particular search engine queried.

Identifying (1114), from search results (1112) returned in the data source search, sources of data corresponding to the data type (1116) may be carried out by retrieving URLs to data sources from hyperlinks in a search results page returned by the search engine.

As discussed above, data management and data rendering for disparate data types includes synthesizing aggregated data of disparate data types into data of a uniform data type. For further explanation, FIG. 9 sets forth a flow chart illustrating a method for synthesizing (414) aggregated data of disparate data types (412) into data of a uniform data type. As discussed above, aggregated data of disparate data types (412) is the accumulation, in a single location, of data of disparate types. This location of the aggregated data may be either physical, such as, for example, on a single computer containing aggregated data, or logical, such as, for example, a single interface providing access to the aggregated data. Also as discussed above, disparate data types are data of different kind and form. That is, disparate data types are data of different kinds. Data of a uniform data type is data having been created or translated into a format of predetermined type. That is, uniform data types are data of a single kind that may be rendered on a device capable of rendering data of the uniform data type. Synthesizing (414) aggregated data of disparate data types (412) into data of a uniform data type advantageously makes the content of the disparate data capable of being rendered on a single device.

Figure 9:
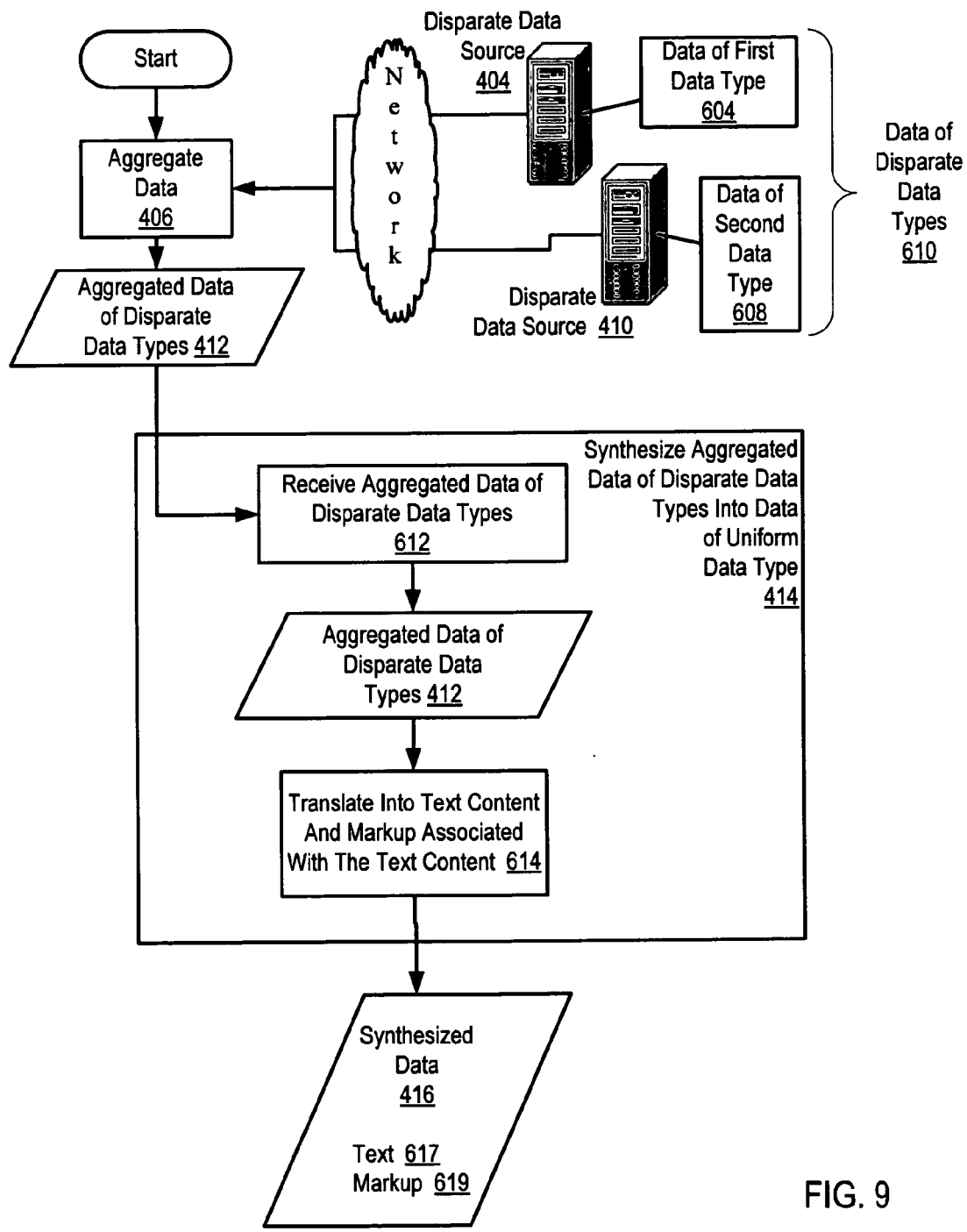
FIG. 9 sets forth a flow chart illustrating a exemplary method for synthesizing aggregated data of disparate data types into data of a uniform data type according to the present invention.

In the method of FIG. 9, synthesizing (414) aggregated data of disparate data types (412) into data of a uniform data type includes receiving (612) aggregated data of disparate data types. Receiving (612) aggregated data of disparate data types (412) may be carried out by receiving, from aggregation process having accumulated the disparate data, data of disparate data types from disparate sources for synthesizing into a uniform data type.

In the method for synthesizing of FIG. 9, synthesizing (414) the aggregated data (406) of disparate data types (610) into data of a uniform data type also includes translating (614) each of the aggregated data of disparate data types (610) into text (617) content and markup (619) associated with the text content. Translating (614) each of the aggregated data of disparate data types (610) into text (617) content and markup (619) associated with the text content according to the method of FIG. 9 includes representing in text and markup the content of the aggregated data such that a browser capable of rendering the text and markup may render from the translated data the same content contained in the aggregated data prior to being synthesized.

In the method of FIG. 9, translating (614) each of the aggregated data of disparate data types (610) into text (617) content and markup (619) may be carried out by creating an X+V document for the aggregated data including text, markup, grammars and so on as will be discussed in more detail below with reference to FIG. 10. The use of X+V is for explanation and not for limitation. In fact, other markup languages may be useful in synthesizing (414) the aggregated data (406) of disparate data types (610) into data of a uniform data type according to the present invention such as XML, VXML, or any other markup language as will occur to those of skill in the art.

Translating (614) each of the aggregated data of disparate data types (610) into text (617) content and markup (619) such that a browser capable of rendering the text and markup may render from the translated data the same content contained in the aggregated data prior to being synthesized may include augmenting the content in translation in some way. That is, translating aggregated data types into text and markup may result in some modification to the content of the data or may result in deletion of some content that cannot be accurately translated. The quantity of such modification and deletion will vary according to the type of data being translated as well as other factors as will occur to those of skill in the art.

Translating (614) each of the aggregated data of disparate data types (610) into text (617) content and markup (619) associated with the text content may be carried out by translating the aggregated data into text and markup and parsing the translated content dependent upon data type. Parsing the translated content dependent upon data type means identifying the structure of the translated content and identifying aspects of the content itself, and creating markup (619) representing the identified structure and content.

Consider for further explanation the following markup language depiction of a snippet of audio clip describing the president.

```
<head> original file type= 'MP3' keyword = 'president' number = '50',
keyword = 'air force' number = '1' keyword = 'white house'
number ='2' >
</head>
    <content>
        Some content about the president
    </content>
```

In the example above an MP3 audio file is translated into text and markup. The header in the example above identifies the translated data as having been translated from an MP3 audio file. The exemplary header also includes keywords included in the content of the translated document and the frequency with which those keywords appear. The exemplary translated data also includes content identified as 'some content about the president.'

As discussed above, one useful uniform data type for synthesized data is XHTML plus Voice. XHTML plus Voice ('X+V') is a Web markup language for developing multimodal applications, by enabling voice with voice markup. X+V provides voice-based interaction in devices using both voice and visual elements. Voice enabling the synthesized data for data management and data rendering according to embodiments of the present invention is typically carried out by creating grammar sets for the text content of the synthesized data. A grammar is a set of words that may be spoken, patterns in which those words may be spoken, or other language elements that define the speech recognized by a speech recognition engine. Such speech recognition engines are useful in a data management and rendering engine to provide users with voice navigation of and voice interaction with synthesized data.

Figure 10:
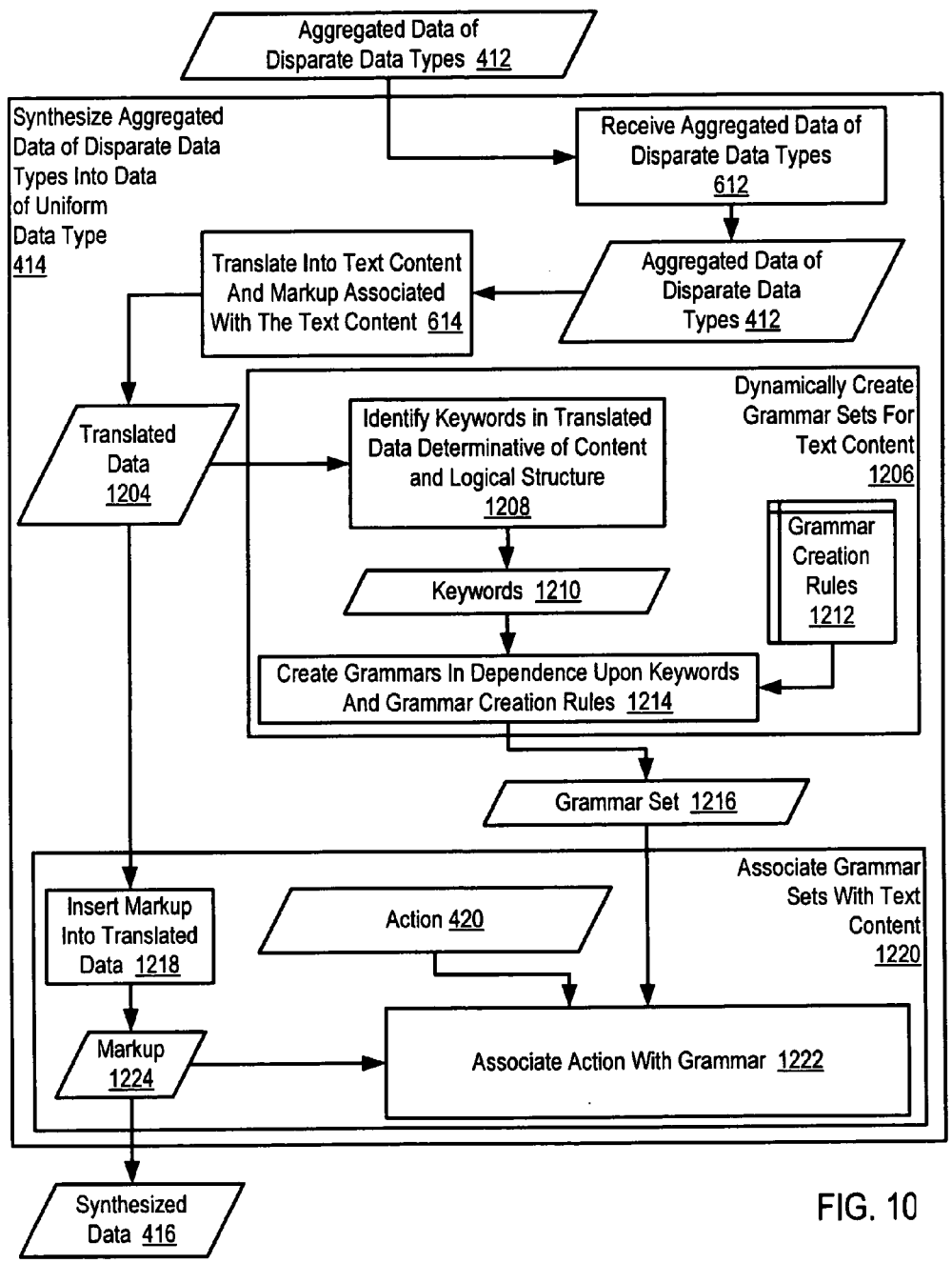
FIG. 10 sets forth a flow chart illustrating a exemplary method for synthesizing aggregated data of disparate data types into data of a uniform data type according to the present invention.

For further explanation, therefore, FIG. 10 sets forth a flow chart illustrating a method for synthesizing (414) aggregated data of disparate data types (412) into data of a uniform data type that includes dynamically creating grammar sets for the text content of synthesized data for voice interaction with a user. Synthesizing (414) aggregated data of disparate data types (412) into data of a uniform data type according to the method of FIG. 10 includes receiving (612) aggregated data of disparate data types (412). As discussed above, receiving (612) aggregated data of disparate data types (412) may be carried out by receiving, from aggregation process having accumulated the disparate data, data of disparate data types from disparate sources for synthesizing into a uniform data type.

The method of FIG. 10 for synthesizing (414) aggregated data of disparate data types (412) into data of a uniform data type also includes translating (614) each of the aggregated data of disparate data types (412) into translated data (1204) comprising text content and markup associated with the text content. As discussed above, translating (614) each of the aggregated data of disparate data types (412) into text content and markup associated with the text content includes representing in text and markup the content of the aggregated data such that a browser capable of rendering the text and markup may render from the translated data the same content contained in the aggregated data prior to being synthesized. In some cases, translating (614) the aggregated data of disparate data types (412) into text content and markup such that a browser capable of rendering the text and markup may include augmenting or deleting some of the content being translated in some way as will occur to those of skill in the art.

In the method of FIG. 10, translating (1202) each of the aggregated data of disparate data types (412) into translated data (1204) comprising text content and markup may be carried out by creating an X+V document for the synthesized data including text, markup, grammars and so on as will be discussed in more detail below. The use of X+V is for explanation and not for limitation. In fact, other markup languages may be useful in translating (614) each of the aggregated data of disparate data types (412) into translated data (1204) comprising text content and markup associated with the text content as will occur to those of skill in the art. The method of FIG. 10 for synthesizing (414) aggregated data of disparate data types (412) into data of a uniform data type may include dynamically creating (1206) grammar sets (1216) for the text content. As discussed above, a grammar is a set of words that may be spoken, patterns in which those words may be spoken, or other language elements that define the speech recognized by a speech recognition engine In the method of FIG. 10, dynamically creating (1206) grammar sets (1216) for the text content also includes identifying (1208) keywords (1210) in the translated data (1204) determinative of content or logical structure and including the identified keywords in a grammar associated with the translated data. Keywords determinative of content are words and phrases defining the topics of the content of the data and the information presented the content of the data. Keywords determinative of logical structure are keywords that suggest the form in which information of the content of the data is presented. Examples of logical structure include typographic structure, hierarchical structure, relational structure, and other logical structures as will occur to those of skill in the art.

Identifying (1208) keywords (1210) in the translated data (1204) determinative of content may be carried out by searching the translated text for words that occur in a text more often than some predefined threshold. The frequency of the word exceeding the threshold indicates that the word is related to the content of the translated text because the predetermined threshold is established as a frequency of use not expected to occur by chance alone. Alternatively, a threshold may also be established as a function rather than a static value. In such cases, the threshold value for frequency of a word in the translated text may be established dynamically by use of a statistical test which compares the word frequencies in the translated text with expected frequencies derived statistically from a much larger corpus. Such a larger corpus acts as a reference for general language use.

Identifying (1208) keywords (1210) in the translated data (1204) determinative of logical structure may be carried out by searching the translated data for predefined words determinative of structure. Examples of such words determinative of logical structure include 'introduction,' 'table of contents,' 'chapter,' 'stanza,' 'index,' and many others as will occur to those of skill in the art.

In the method of FIG. 10, dynamically creating (1206) grammar sets (1216) for the text content also includes creating (1214) grammars in dependence upon the identified keywords (1210) and grammar creation rules (1212). Grammar creation rules are a pre-defined set of instructions and grammar form for the production of grammars. Creating (1214) grammars in dependence upon the identified keywords (1210) and grammar creation rules (1212) may be carried out by use of scripting frameworks such as JavaServer Pages, Active Server Pages, PHP, Perl, XML from translated data. Such dynamically created grammars may be stored externally and referenced, in for example, X+V the <grammar src=""/> tag that is used to reference external grammars.

The method of FIG. 10 for synthesizing (414) aggregated data of disparate data types (412) into data of a uniform data type includes associating (1220) the grammar sets (1216) with the text content. Associating (1220) the grammar sets (1216) with the text content includes inserting (1218) markup (1224) defining the created grammar into the translated data (1204). Inserting (1218) markup in the translated data (1204) may be carried out by creating markup defining the dynamically created grammar inserting the created markup into the translated document.

The method of FIG. 10 also includes associating (1222) an action (420) with the grammar. As discussed above, an action is a set of computer instructions that when executed carry out a predefined task. Associating (1222) an action (420) with the grammar thereby provides voice initiation of the action such that the associated action is invoked in response to the recognition of one or more words or phrases of the grammar.

Figure 11:
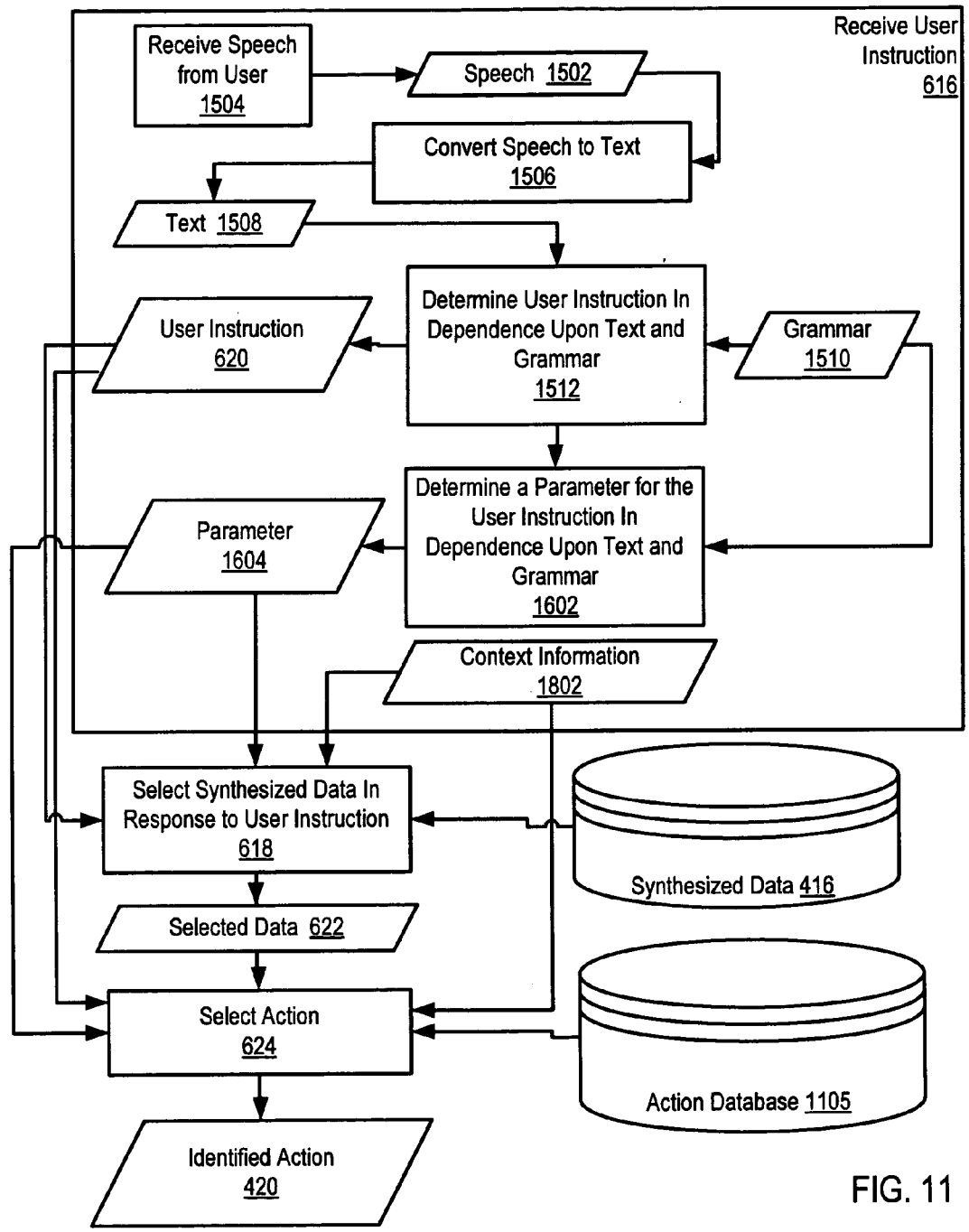
FIG. 11 sets forth a flow chart illustrating an exemplary method for identifying an action in dependence upon the synthesized data according to the present invention.

As discussed above, data management and data rendering for disparate data types includes identifying an action in dependence upon the synthesized data. For further explanation, FIG. 11 sets forth a flow chart illustrating an exemplary method for identifying an action in dependence upon the synthesized data (416) including receiving (616) a user instruction (620) and identifying an action in dependence upon the synthesized data (416) and the user instruction. In the method of FIG. 11, identifying an action may be carried out by retrieving an action ID from an action list. In the method of FIG. 11, retrieving an action ID from an action list includes retrieving from a list the identification of the action (the 'action ID') to be executed in dependence upon the user instruction and the synthesized data. The action list can be implemented, for example, as a Java list container, as a table in random access memory, as a SQL database table with storage on a hard drive or CD ROM, and in other ways as will occur to those of skill in the art. As mentioned above, the actions themselves comprise software, and so can be implemented as concrete action classes embodied, for example, in a Java package imported into a data management and data rendering module at compile time and therefore always available during run time.

In the method of FIG. 11, receiving (616) a user instruction (620) includes receiving (1504) speech (1502) from a user, converting (1506) the speech (1502) to text (1508); determining (1512) in dependence upon the text (1508) and a grammar (1510) the user instruction (620) and determining (1602) in dependence upon the text (1508) and a grammar (1510) a parameter (1604) for the user instruction (620). As discussed above with reference to FIG. 4, a user instruction is an event received in response to an act by a user. A parameter to a user instruction is additional data further defining the instruction. For example, a user instruction for 'delete email' may include the parameter 'Aug. 11, 2005' defining that the email of Aug. 11, 2005 is the synthesized data upon which the action invoked by the user instruction is to be performed. Receiving (1504) speech (1502) from a user, converting (1506) the speech (1502) to text (1508); determining (1512) in dependence upon the text (1508) and a grammar (1510) the user instruction (620); and determining (1602) in dependence upon the text (1508) and a grammar (1510) a parameter (1604) for the user instruction (620) may be carried out by a speech recognition engine incorporated into a data management and data rendering module according to the present invention.

Identifying an action in dependence upon the synthesized data (416) according to the method of FIG. 11 also includes selecting (618) synthesized data (416) in response to the user instruction (620). Selecting (618) synthesized data (416) in response to the user instruction (620) may be carried out by selecting synthesized data identified by the user instruction (620). Selecting (618) synthesized data (416) may also be carried out by selecting the synthesized data (416) in dependence upon a parameter (1604) of the user instruction (620).

Selecting (618) synthesized data (416) in response to the user instruction (620) may be carried out by selecting synthesized data context information (1802). Context information is data describing the context in which the user instruction is received such as, for example, state information of currently displayed synthesized data, time of day, day of week, system configuration, properties of the synthesized data, or other context information as will occur to those of skill in the art. Context information may be usefully used instead or in conjunction with parameters to the user instruction identified in the speech. For example, the context information identifying that synthesized data translated from an email document is currently being displayed may be used to supplement the speech user instruction 'delete email' to identify upon which synthesized data to perform the action for deleting an email.

Identifying an action in dependence upon the synthesized data (416) according to the method of FIG. 11 also includes selecting (624) an action (420) in dependence upon the user instruction (620) and the selected data (622). Selecting (624) an action (420) in dependence upon the user instruction (620) and the selected data (622) may be carried out by selecting an action identified by the user instruction. Selecting (624) an action (420) may also be carried out by selecting the action (420) in dependence upon a parameter (1604) of the user instructions (620) and by selecting the action (420) in dependence upon a context information (1802). In the example of FIG. 11, selecting (624) an action (420) is carried out by retrieving an action from an action database (1105) in dependence upon one or more a user instructions, parameters, or context information.

Executing the identified action may be carried out by use of a switch( ) statement in an action agent of a data management and data rendering module. Such a switch( ) statement can be operated in dependence upon the action ID and implemented, for example, as illustrated by the following segment of pseudocode:

```
switch (actionID) {
    Case 1: actionNumber1.take_action( ); break;
    Case 2: actionNumber2.take_action( ); break;
    Case 3: actionNumber3.take_action( ); break;
    Case 4: actionNumber4.take_action( ); break;
    Case 5: actionNumber5.take_action( ); break;
    // and so on
} // end switch( )
```

The exemplary switch statement selects an action to be performed on synthesized data for execution depending on the action ID. The tasks administered by the switch( ) in this example are concrete action classes named actionNumber1, actionNumber2, and so on, each having an executable member method named 'take_action( ),' which carries out the actual work implemented by each action class.

Executing an action may also be carried out in such embodiments by use of a hash table in an action agent of a data management and data rendering module. Such a hash table can store references to action object keyed by action ID, as shown in the following pseudocode example. This example begins by an action service's creating a hashtable of actions, references to objects of concrete action classes associated with a user instruction. In many embodiments it is an action service that creates such a hashtable, fills it with references to action objects pertinent to a particular user instruction, and returns a reference to the hashtable to a calling action agent.

Hashtable ActionHashTable=new Hashtable( );
 ActionHashTable.put("1", new Action1( ));
 ActionHashTable.put("2", new Action2( ));
 ActionHashTable.put("3", new Action3( ));

Executing a particular action then can be carried out according to the following pseudocode:

Action anAction=(Action) ActionHashTable.get("2");
 if (anAction !=null) anAction.take_action( );

Executing an action may also be carried out by use of list. Lists often function similarly to hashtables. Executing a particular action, for example, can be carried out according to the following pseudocode:

List ActionList=new List( );
 ActionList.add(1, new Action1( ));
 ActionList.add(2, new Action2( ));
 ActionList.add(3, new Action3( ));

Executing a particular action then can be carried out according to the following pseudocode:

Action anAction=(Action) ActionList.get(2);
 if (anAction !=null) anAction.take_action( );

The three examples above use switch statements, hash tables, and list objects to explain executing actions according to embodiments of the present invention. The use of switch statements, hash tables, and list objects in these examples are for explanation, not for limitation. In fact, there are many ways of executing actions according to embodiments of the present invention, as will occur to those of skill in the art, and all such ways are well within the scope of the present invention.

For further explanation of identifying an action in dependence upon the synthesized data consider the following example of user instruction that identifies an action, a parameter for the action, and the synthesized data upon which to perform the action. A user is currently viewing synthesized data translated from email and issues the following speech instruction: "Delete email dated Aug. 15, 2005." In the current example, identifying an action in dependence upon the synthesized data is carried out by selecting an action to delete and synthesized data in dependence upon the user instruction, by identifying a parameter for the delete email action identifying that only one email is to be deleted, and by selecting synthesized data translated from the email of Aug. 15, 2005 in response to the user instruction.

For further explanation of identifying an action in dependence upon the synthesized data consider the following example of user instruction that does not specifically identify the synthesized data upon which to perform an action. A user is currently viewing synthesized data translated from a series of emails and issues the following speech instruction: "Delete current email." In the current example, identifying an action in dependence upon the synthesized data is carried out by selecting an action to delete synthesized data in dependence upon the user instruction. Selecting synthesized data upon which to perform the action, however, in this example is carried out in dependence upon the following data selection rule that makes use of context information.

If synthesized data=displayed;
  Then synthesized data='current'.
 If synthesized includes=email type code;
  Then synthesized data=email.

The exemplary data selection rule above identifies that if synthesized data is displayed then the displayed synthesized data is 'current' and if the synthesized data includes an email type code then the synthesized data is email. Context information is used to identify currently displayed synthesized data translated from an email and bearing an email type code. Applying the data selection rule to the exemplary user instruction "delete current email" therefore results in deleting currently displayed synthesized data having an email type code.

As discussed above, data management and data rendering for disparate data types often includes channelizing the synthesized data. Channelizing the synthesized data (416) advantageously results in the separation of synthesized data into logical channels. A channel implemented as a logical accumulation of synthesized data sharing common attributes having similar characteristics. Examples of such channels are 'entertainment channel' for synthesized data relating to entertainment, 'work channel' for synthesized data relating to work, 'family channel' for synthesized data relating to a user's family and so on.

Figure 12:
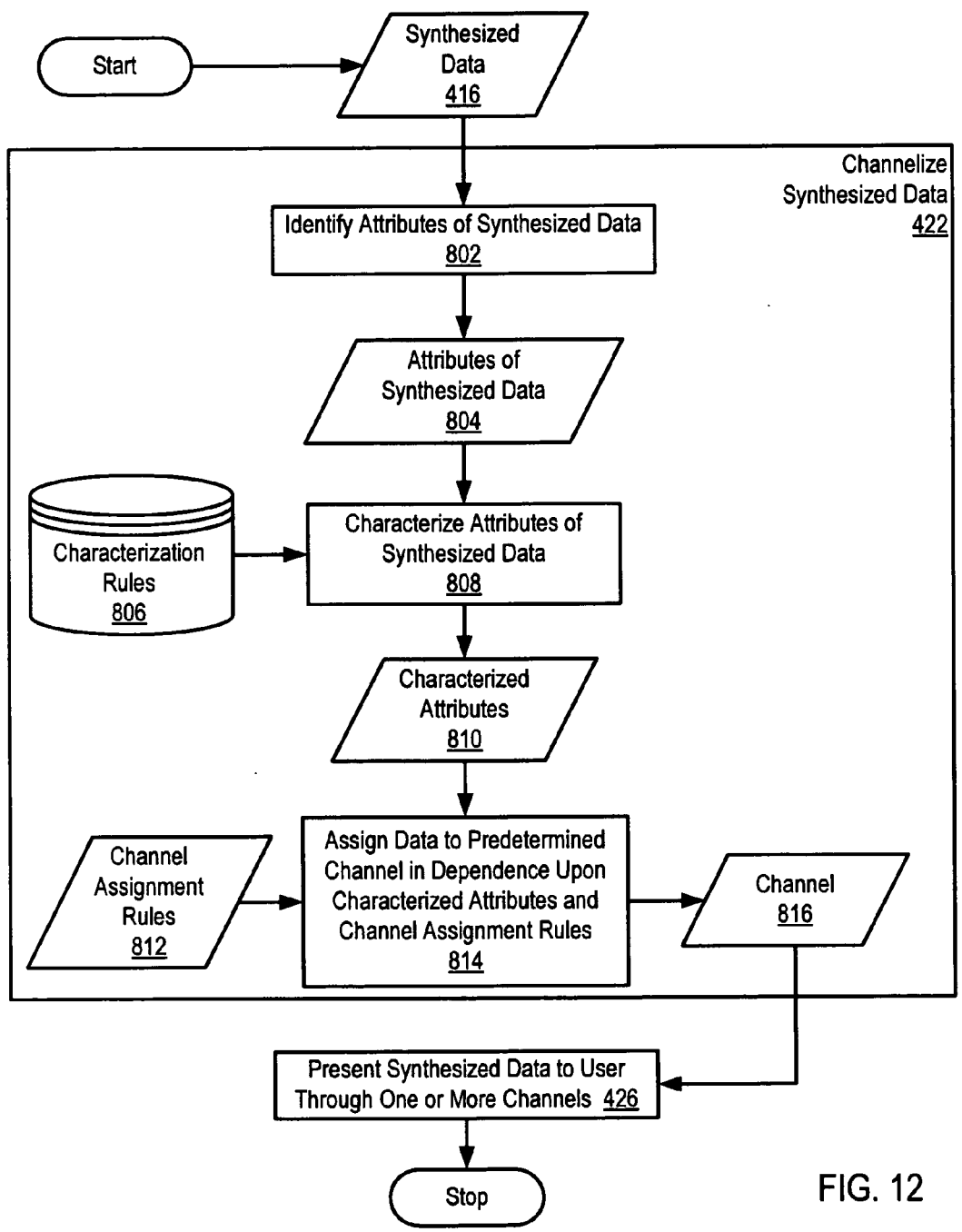

For further explanation, therefore, FIG. 12 sets forth a flow chart illustrating an exemplary method for channelizing (422) the synthesized data (416) according to embodiments of the present invention, which includes identifying (802) attributes of the synthesized data (804). Attributes of synthesized data (804) are aspects of the data which may be used to characterize the synthesized data (416). Exemplary attributes (804) include the type of the data, metadata present in the data, logical structure of the data, presence of particular keywords in the content of the data, the source of the data, the application that created the data, URL of the source, author, subject, date created, and so on. Identifying (802) attributes of the synthesized data (804) may be carried out by comparing contents of the synthesized data (804) with a list of predefined attributes. Another way that identifying (802) attributes of the synthesized data (804) may be carried out by comparing metadata associated with the synthesized data (804) with a list of predefined attributes.

The method of FIG. 12 for channelizing (422) the synthesized data (416) also includes characterizing (808) the attributes of the synthesized data (804). Characterizing (808) the attributes of the synthesized data (804) may be carried out by evaluating the identified attributes of the synthesized data. Evaluating the identified attributes of the synthesized data may include applying a characterization rule (806) to an identified attribute. For further explanation consider the following characterization rule:

If synthesized data=email; AND
 If email to="Joe"; AND
 If email from="Bob";
  Then email='work email.'

In the example above, the characterization rule dictates that if synthesized data is an email and if the email was sent to "Joe" and if the email sent from "Bob" then the exemplary email is characterized as a 'work email.'

Characterizing (808) the attributes of the synthesized data (804) may further be carried out by creating, for each attribute identified, a characteristic tag representing a characterization for the identified attribute. Consider for further explanation the following example of synthesized data translated from an email having inserted within it a characteristic tag.

```
<head >
original message type = 'email' to = 'joe' from = 'bob' re = 'I will be late tomorrow'</head>
    <characteristic>
        characteristic = 'work'
    <characteristic>
    <body>
        Some body content
    </body>
```

In the example above, the synthesized data is translated from an email sent to Joe from 'Bob' having a subject line including the text 'I will be late tomorrow. In the example above <characteristic> tags identify a characteristic field having the value 'work' characterizing the email as work related. Characteristic tags aid in channelizing synthesized data by identifying characteristics of the data useful in channelizing the data.

The method of FIG. 12 for channelizing (422) the synthesized data (416) also includes assigning (814) the data to a predetermined channel (816) in dependence upon the characterized attributes (810) and channel assignment rules (812). Channel assignment rules (812) are predetermined instructions for assigning synthesized data (416) into a channel in dependence upon characterized attributes (810). Consider for further explanation the following channel assignment rule:

If synthesized data='email'; and
If Characterization='work related email'
    Then channel='work channel.'

In the example above, if the synthesized data is translated from an email and if the email has been characterized as 'work related email' then the synthesized data is assigned to a 'work channel.'

Assigning (814) the data to a predetermined channel (816) may also be carried out in dependence upon user preferences, and other factors as will occur to those of skill in the art. User preferences are a collection of user choices as to configuration, often kept in a data structure isolated from business logic. User preferences provide additional granularity for channelizing synthesized data according to the present invention.

Under some channel assignment rules (812), synthesized data (416) may be assigned to more than one channel (816). That is, the same synthesized data may in fact be applicable to more than one channel. Assigning (814) the data to a predetermined channel (816) may therefore be carried out more than once for a single portion of synthesized data.

The method of FIG. 12 for channelizing (422) the synthesized data (416) may also include presenting (426) the synthesized data (416) to a user through one or more channels (816). One way presenting (426) the synthesized data (416) to a user through one or more channels (816) may be carried out is by presenting summaries or headings of available channels in a user interface allowing a user access to the content of those channels. These channels could be accessed via this presentation in order to access the synthesized data (416). The synthesized data is additionally to the user through the selected channels by displaying or playing the synthesized data (416) contained in the channel.

Exemplary embodiments of the present invention are described largely in the context of a fully functional computer system for synthesizing aggregated data of disparate data types into data of a uniform data type. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for synthesizing aggregated data of disparate data types into data of a uniform data type comprising:
    receiving aggregated data of disparate data types, wherein at least one of the aggregated data of disparate data types comprises non-text based audio or image data that cannot be accurately translated by a browser capable of rendering text and markup;
    translating each of the aggregated data of disparate data types into translated data comprising text content and markup associated with the text content;
    modifying content of the non-text based audio or image data to delete or augment at least some of the content;
    dynamically creating grammar sets for the text content, further comprising:
        identifying keywords determinative of the text content or logical structure of the translated data; and
        creating grammars in dependence upon the keywords and grammar creation rules;
    associating the grammar sets with the text content; and
    associating actions respectively with each of the grammars, each of the actions being one of a plurality of predefined tasks for interacting with, modifying or managing the text content.

2. The method of claim 1 wherein associating the grammar sets with the text content further comprises inserting markup in the translated data.

3. The method of claim 1 wherein the identifying of keywords comprises comparing usage of potential keywords in the translated data with a predetermined usage threshold based on expected usage of the potential keywords.

4. The method of claim 1 further comprising:
    receiving a user instruction communicating a predefined task among the plurality of predefined tasks;
    recognizing the user instruction; and
    performing said predefined task on the text content in response to recognizing the user instruction.

5. The method of claim 4 wherein the user instruction is a spoken user instruction; and
    wherein the recognizing of the spoken user instruction involves speech recognition of the spoken user instruction.

6. A system for synthesizing aggregated data of disparate data types into data of a uniform data type, the system comprising:
    a computer processor;
    a computer memory operatively coupled to the computer processor, the computer memory having disposed within it computer program instructions capable of:

receiving aggregated data of disparate data types, wherein at least one of the aggregated data of disparate data types comprises non-text based audio or image data that cannot be accurately translated by a browser capable of rendering text and markup;

translating each of the aggregated data of disparate data types into translated data comprising text content and markup associated with the text content;

modifying content of the non-text based audio or image data to delete or augment at least some of the content;

dynamically creating grammar sets for the text content, further comprising:

identifying keywords determinative of the text content or logical structure of the translated data; and creating grammars in dependence upon the keywords and grammar creation rules;

associating the grammar sets with the text content; and associating actions respectively with each of the grammars, each of the actions being one of a plurality of predefined tasks for interacting with, modifying or managing the text content.

7. The system of claim 6 wherein the computer memory also has disposed within it computer program instructions capable of inserting markup in the translated data.

8. The system of claim 6 wherein the identifying of keywords comprises comparing usage of potential keywords in the translated data with a predetermined usage threshold based on expected usage of the potential keywords.

9. The system of claim 6 wherein the computer program instructions further comprise:

receiving a user instruction communicating a predefined task among the plurality of predefined tasks;

recognizing the user instruction; and performing said predefined task on the text content in response to recognizing the user instruction.

10. The system of claim 9 wherein the user instruction is a spoken user instruction; and wherein the recognizing of the spoken user instruction involves speech recognition of the spoken user instruction.

11. A computer program product for synthesizing aggregated data of disparate data types into data of a uniform data type, the computer program product embodied on a non-transistory computer-readable medium, the computer program product comprising:

computer program instructions for receiving aggregated data of disparate data types, wherein the aggregated data of disparate data types comprises non-text based audio or image data that cannot be accurately translated by a browser capable of rendering text and markup;

computer program instructions for translating each of the aggregated data of disparate data types into translated data comprising text content and markup associated with the text content;

modifying content of the non-text based audio or image data to delete or augment at least some of the content;

computer program instructions for dynamically creating grammar sets for the text content, further comprising:

computer program instructions for identifying keywords determinative of the text content or logical structure of the translated data; and computer program instructions for creating grammars in dependence upon the keywords and grammar creation rules;

computer program instructions for associating the grammar sets with the text content; and computer program instructions for associating actions respectively with each of the grammars, each of the actions being one of a plurality of predefined tasks for interacting with, modifying or managing the text content.

12. The computer program product of claim 11 wherein computer program instructions for associating the grammar sets with the text content further comprise computer program instructions for inserting markup in the translated data.

13. The computer program product of claim 11 wherein the identifying of keywords comprises comparing usage of potential keywords in the translated data with a predetermined usage threshold based on expected usage of the potential keywords.

14. The computer program product of claim 11 further comprising:

computer program instructions for receiving a user instruction communicating a predefined task among the plurality of predefined tasks;

computer program instructions for recognizing the user instruction; and computer program instructions for performing said predefined task on the text content in response to recognizing the user instruction.

15. The computer program product of claim 14 wherein the user instruction is a spoken user instruction; and wherein the recognizing of the spoken user instruction involves speech recognition of the spoken user instruction.

* * * * *